(12) United States Patent
Ji et al.

(10) Patent No.: US 10,541,862 B2
(45) Date of Patent: Jan. 21, 2020

(54) VNF PROCESSING POLICY DETERMINING METHOD, APPARATUS, AND SYSTEM

(71) Applicant: Huawei Technologies Co., Ltd., Shenzhen (CN)

(72) Inventors: Li Ji, Shanghai (CN); Lan Zou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 15/668,911

(22) Filed: Aug. 4, 2017

(65) Prior Publication Data

US 2017/0331680 A1  Nov. 16, 2017

Related U.S. Application Data

(63) Continuation of application No. PCT/CN2015/072411, filed on Feb. 6, 2015.

(51) Int. Cl.
*H04L 12/24* (2006.01)
*H04L 12/46* (2006.01)

(52) U.S. Cl.
CPC ...... *H04L 41/0803* (2013.01); *H04L 12/4641* (2013.01); *H04L 41/00* (2013.01)

(58) Field of Classification Search
CPC . H04L 12/4641; H04L 41/00; H04L 41/0803; H04L 43/0876
USPC ........................................................ 709/220
See application file for complete search history.

(56) References Cited

U.S. PATENT DOCUMENTS

| 2014/0229945 | A1 | 8/2014 | Barkai et al. |
| 2014/0317261 | A1 | 10/2014 | Shatzkamer et al. |
| 2015/0063166 | A1* | 3/2015 | Sif ...................... G06F 9/45558 370/254 |
| 2016/0359682 | A1* | 12/2016 | Senarath ............... H04W 16/14 |

(Continued)

FOREIGN PATENT DOCUMENTS

| CN | 101051984 A | 10/2007 |
| CN | 103428025 A | 12/2013 |
| CN | 104115447 A | 10/2014 |

(Continued)

OTHER PUBLICATIONS

ETSI, "Network Functions Virtualisation (NFV); Management and Orchestration," ETSI GS NFV-MAN 001 V1.1.1 (Dec. 2014), 184 pages.

(Continued)

*Primary Examiner* — Kristie D Shingles

(57) ABSTRACT

Embodiments of the present disclosure provide a VNF processing policy determining method, an apparatus, and a system, and relate to the field of communications technologies, to avoid a problem that an NS constituted by a VNF cannot normally run when an EM fails to configure an application parameter for the VNF. The method includes: receiving, by a management node, a configuration feedback message sent by an EM, and determining a processing policy for a VNF according to the configuration feedback message, where the configuration feedback message is used to indicate whether an application parameter of the VNF is successfully configured, and the processing policy is used by the management node to process the VNF. The method is applied to an NFV technology.

17 Claims, 18 Drawing Sheets

(56) References Cited

U.S. PATENT DOCUMENTS

2017/0034318 A1    2/2017  Gong et al.
2017/0150399 A1*  5/2017  Kedalagudde ........ H04W 28/08

FOREIGN PATENT DOCUMENTS

| CN | 104253866 A | 12/2014 |
|----|-------------|---------|
| WO | 2014169870 A1 | 10/2014 |

OTHER PUBLICATIONS

Ersue, M., "ETSI NFV Management and Orchestration—An Overview," IETF#88, Vancouver, Canada, Nov. 14, 2013, 14 pages.

* cited by examiner

VNF PROCESSING POLICY DETERMINING METHOD, APPARATUS, AND SYSTEM

CROSS-REFERENCE TO RELATED APPLICATIONS

This application is a continuation of International Application No. PCT/CN2015/072411, filed on Feb. 6, 2015, the disclosure of which is hereby incorporated by reference in its entirety.

TECHNICAL FIELD

The present disclosure relates to the field of communications technologies, and in particular, to a VNF processing policy determining method, an apparatus, and a system.

BACKGROUND

With rapid development of virtualization technologies, a network functions virtualization (NFV for short) technology becomes greatly important. The NFV technology means that instantiation is performed on a virtualized network function (VNF for short), so that the VNF can run on a general-purpose physical device, and a function of a specialized network element device in a network is implemented by using the general-purpose physical device. For example, a serving gateway (SGW for short) function is instantiated, so that the SGW function can run on a general-purpose physical device, and the SGW function is implemented by using the general-purpose physical device.

In the prior art, a procedure of instantiating a VNF by means of NFV is as follows: After a virtualized network function manager (VNFM) receives a VNF instantiation request (instantiate VNF), the VNFM instructs a network functions virtualization orchestrator (NFVO for short) to allocate a resource to a to-be-instantiated VNF, and the VNFM configures a deployment parameter for the VNF, to complete instantiation of the VNF. In addition, the VNFM instructs an element manager (EM for short) to configure an application parameter for the VNF, so that the VNF can run. The VNFM notifies a network manager (NM for short) that the instantiation of the VNF is completed, so that the NM uses the VNF to constitute a corresponding network service (NS for short).

However, the EM may fail to configure the application parameter for the VNF, and consequently, the VNF cannot normally run. Therefore, according to the foregoing procedure, even if the application parameter fails to be configured, after the VNFM notifies the NM that the instantiation of the VNF is completed, the NM still considers that the VNF can normally run, and uses the VNF to constitute the corresponding NS. Consequently, the NS constituted by the VNF cannot normally run.

SUMMARY

The present disclosure provides a VNF processing policy determining method, an apparatus, and a system, to avoid a problem that an NS constituted by a VNF cannot normally run when an EM fails to configure an application parameter for the VNF.

To achieve the foregoing objective, the present disclosure uses the following technical solutions.

According to a first aspect, the present disclosure provides a VNF processing policy determining method. The method includes receiving, by a management node, a configuration feedback message sent by an EM, where the configuration feedback message is used to indicate whether an application parameter of a VNF is successfully configured. The method also includes determining, by the management node, a processing policy for the VNF according to the configuration feedback message, where the processing policy is used by the management node to process the VNF.

In a first possible implementation of the first aspect, the management node is an NM; and if the configuration feedback message indicates that the application parameter of the VNF is successfully configured, the processing policy is that the NM instructs an NFVO to use the VNF to constitute an NS; or if the configuration feedback message indicates that the application parameter of the VNF fails to be configured, the processing policy is that the NM instructs the NFVO to release a resource occupied by the VNF.

With reference to the first possible implementation of the first aspect, in a second possible implementation, before the receiving, by a management node, a configuration feedback message sent by an EM, the method further includes: sending, by the NM, a search message to the EM, where the search message carries an identifier of the VNF, and the search message is used to instruct the EM to search for the configuration feedback message corresponding to the identifier of the VNF.

With reference to the first possible implementation of the first aspect, in a third possible implementation, before the receiving, by a management node, a configuration feedback message sent by an EM, the method further includes: sending, by the NM, a VNF application parameter configuration notification message to the EM, where the VNF application parameter configuration notification message is used to instruct the EM to configure the application parameter for the VNF.

With reference to the first possible implementation of the first aspect, in a fourth possible implementation, before the receiving, by a management node, a configuration feedback message sent by an EM, the method further includes: sending, by the NM, a VNF instantiation complete message to the EM, where the VNF instantiation complete message is used to indicate that instantiation of the VNF is completed.

With reference to the first aspect, in a fifth possible implementation, the management node is a VNFM; and if the configuration feedback message indicates that the application parameter of the VNF is successfully configured, the processing policy is that the VNFM sends a VNF instantiation complete message to an NM by using an NFVO, and the NM instructs, according to the VNF instantiation complete message, the NFVO to use the VNF to constitute an NS; or if the configuration feedback message indicates that the application parameter of the VNF fails to be configured, the processing policy is that the VNFM instructs the NFVO to release a resource occupied by the VNF.

According to a second aspect, the present disclosure provides a VNF processing policy determining method. The method includes sending, by an EM, an application parameter configuration message to a VNF, where the application parameter configuration message is used to instruct the VNF to configure an application parameter of the VNF. The method also includes receiving, by the EM, a configuration feedback message sent by the VNF, where the configuration feedback message is used to indicate whether the application parameter of the VNF is successfully configured. The method also includes sending, by the EM, the configuration feedback message to a management node, where the configuration feedback message is used by the management node to determine a processing policy for the VNF, and the processing policy is used by the management node to process the VNF.

In a first possible implementation of the second aspect, the management node is an NM; and before the sending, by the EM, the configuration feedback message to a management node, the method further includes: receiving, by the EM, a search message sent by the NM, where the search message carries an identifier of the VNF, and the search message is used to instruct the EM to search for the configuration feedback message corresponding to the identifier of the VNF; and searching, by the EM according to the identifier of the VNF, for the configuration feedback message corresponding to the identifier of the VNF from multiple configuration feedback messages saved by the EM.

With reference to the second aspect, in a second possible implementation, the management node is an NM; before the sending, by an EM, an application parameter configuration message to a VNF, the method further includes: receiving, by the EM, a VNF application parameter configuration notification message sent by the NM, where the VNF application parameter configuration notification message is used to instruct the EM to configure the application parameter for the VNF; and the sending, by the EM, the configuration feedback message to a management node includes: sending, by the EM, the configuration feedback message to the NM.

With reference to the second aspect, in a third possible implementation, the management node is an NM; before the sending, by an EM, an application parameter configuration message to a VNF, the method further includes: receiving, by the EM, a VNF instantiation complete message sent by the NM or a VNFM, where the VNF instantiation complete message is used to indicate that instantiation of the VNF is completed; and the sending, by the EM, the configuration feedback message to a management node includes: sending, by the EM, the configuration feedback message to the NM.

With reference to the second aspect, in a fourth possible implementation, the management node is a VNFM; before the sending, by an EM, an application parameter configuration message to a VNF, the method further includes: receiving, by the EM, a VNF instantiation complete message sent by the VNFM, where the VNF instantiation complete message is used to indicate that instantiation of the VNF is completed; and the sending, by the EM, the configuration feedback message to a management node includes: sending, by the EM, the configuration feedback message to the VNFM.

According to a third aspect, the present disclosure provides a VNF processing policy determining method. The method includes receiving, by a VNF, an application parameter configuration message sent by an EM, where the application parameter configuration message is used to instruct the VNF to configure an application parameter of the VNF. The method also includes generating, by the VNF, a configuration feedback message according to a result of configuring the application parameter by the VNF, where the configuration feedback message is used to indicate whether the application parameter of the VNF is successfully configured. The method also includes sending, by the VNF, the configuration feedback message to the EM, where the EM sends the configuration feedback message to a management node, the configuration feedback message is used by the management node to determine a processing policy for the VNF, and the processing policy is used by the management node to process the VNF.

In a first possible implementation of the third aspect, the configuration feedback message carries an identifier of the VNF, and the identifier of the VNF is allocated by the EM, the management node, or an NFVO to the VNF.

According to a fourth aspect, the present disclosure provides a management node. The node includes a receiving unit, configured to receive a configuration feedback message sent by an EM, where the configuration feedback message is used to indicate whether an application parameter of a VNF is successfully configured. The node also includes a processing unit, configured to determine a processing policy for the VNF according to the configuration feedback message received by the receiving unit, where the processing policy is used by the processing unit to process the VNF.

In a first possible implementation of the fourth aspect, the management node is an NM; and if the configuration feedback message received by the receiving unit indicates that the application parameter of the VNF is successfully configured, the processing policy determined by the processing unit is that the processing unit instructs an NFVO to use the VNF to constitute a network service NS; or if the configuration feedback message received by the receiving unit indicates that the application parameter of the VNF fails to be configured, the processing policy determined by the processing unit is that the processing unit instructs the NFVO to release a resource occupied by the VNF.

With reference to the first possible implementation of the fourth aspect, in a second possible implementation, the NM further includes a sending unit; and the sending unit is configured to send a search message to the EM before the receiving unit receives the configuration feedback message sent by the EM, where the search message carries an identifier of the VNF, and the search message is used to instruct the EM to search for the configuration feedback message corresponding to the identifier of the VNF.

With reference to the first possible implementation of the fourth aspect, in a third possible implementation, the NM further includes a sending unit; and the sending unit is configured to send a VNF application parameter configuration notification message to the EM before the receiving unit receives the configuration feedback message sent by the EM, where the VNF application parameter configuration notification message is used to instruct the EM to configure the application parameter for the VNF.

With reference to the first possible implementation of the fourth aspect, in a fourth possible implementation, the NM further includes a sending unit; and the sending unit is configured to send a VNF instantiation complete message to the EM before the receiving unit receives the configuration feedback message sent by the EM, where the VNF instantiation complete message is used to indicate that instantiation of the VNF is completed.

With reference to the fourth aspect, in a fifth possible implementation, the management node is a VNFM; and if the configuration feedback message received by the receiving unit indicates that the application parameter of the VNF is successfully configured, the processing policy determined by the processing unit is that the processing unit sends a VNF instantiation complete message to an NM by using an NFVO, and the NM instructs, according to the VNF instantiation complete message, the NFVO to use the VNF to constitute an NS; or if the configuration feedback message received by the receiving unit indicates that the application parameter of the VNF fails to be configured, the processing policy determined by the processing unit is that the processing unit instructs the NFVO to release a resource occupied by the VNF.

According to a fifth aspect, the present disclosure provides an EM. The EM includes a sending unit, configured to send an application parameter configuration message to a VNF, where the application parameter configuration message is used to instruct the VNF to configure an application parameter of the VNF. The EM also includes a receiving unit, configured to receive a configuration feedback message sent by the VNF, where the configuration feedback message is used to indicate whether the application parameter of the VNF is successfully configured. The sending unit is further configured to send, to a management node, the configuration feedback message received by the receiving unit, where the configuration feedback message is used by the management node to determine a processing policy for the VNF, and the processing policy is used by the management node to process the VNF.

In a first possible implementation of the fifth aspect, the management node is an NM, and the EM further includes a search unit; the receiving unit is further configured to receive, before the sending unit sends the configuration feedback message to the management node, a search message sent by the NM, where the search message carries an identifier of the VNF, and the search message is used to instruct the search unit to search for the configuration feedback message corresponding to the identifier of the VNF; and the search unit is configured to search, according to the identifier of the VNF, for the configuration feedback message corresponding to the identifier of the VNF from multiple saved configuration feedback messages.

With reference to the fifth aspect, in a second possible implementation, the management node is an NM; the receiving unit is further configured to receive, before the sending unit sends the application parameter configuration message to the VNF, a VNF application parameter configuration notification message sent by the NM, where the VNF application parameter configuration notification message is used to instruct the EM to configure the application parameter for the VNF; and the sending unit is specifically configured to send the configuration feedback message to the NM.

With reference to the fifth aspect, in a third possible implementation, the management node is an NM; the receiving unit is further configured to receive, before the sending unit sends the application parameter configuration message to the VNF, a VNF instantiation complete message sent by the NM or a VNFM, where the VNF instantiation complete message is used to indicate that instantiation of the VNF is completed; and the sending unit is specifically configured to send the configuration feedback message to the NM.

With reference to the fifth aspect, in a fourth possible implementation, the management node is a VNFM; the receiving unit is further configured to receive, before the sending unit sends the application parameter configuration message to the VNF, a VNF instantiation complete message sent by the VNFM, where the VNF instantiation complete message is used to indicate that instantiation of the VNF is completed; and the sending unit is specifically configured to send the configuration feedback message to the VNFM.

According to a sixth aspect, the present disclosure provides a VNF. The VNF includes a receiving unit, configured to receive an application parameter configuration message sent by an EM, where the application parameter configuration message is used to instruct the VNF to configure an application parameter of the VNF. The VNF also includes a generation unit, configured to generate a configuration feedback message according to a result of configuring the application parameter by the VNF, where the configuration feedback message is used to indicate whether the application parameter of the VNF is successfully configured. The VNF also includes a sending unit, configured to send, to the EM, the configuration feedback message generated by the generation unit, where the EM sends the configuration feedback message to a management node, the configuration feedback message is used by the management node to determine a processing policy for the VNF, and the processing policy is used by the management node to process the VNF.

In a first possible implementation of the sixth aspect, the configuration feedback message generated by the generation unit carries an identifier of the VNF, and the identifier of the VNF is allocated by the EM, the management node, or an NFVO to the VNF.

According to a seventh aspect, the present disclosure provides a management node. The management node includes a processor, configured to receive a configuration feedback message sent by an EM, and determine a processing policy for a VNF according to the configuration feedback message, where the configuration feedback message is used to indicate whether an application parameter of the VNF is successfully configured, and the processing policy is used by the processor to process the VNF.

In a first possible implementation of the seventh aspect, the management node is an NM; and if the configuration feedback message received by the processor indicates that the application parameter of the VNF is successfully configured, the processing policy determined by the processor is that the processor instructs an NFVO to use the VNF to constitute an NS; or if the configuration feedback message received by the processor indicates that the application parameter of the VNF fails to be configured, the processing policy determined by the processor is that the processor instructs the NFVO to release a resource occupied by the VNF.

With reference to the first possible implementation of the seventh aspect, in a second possible implementation, the processor is further configured to send a search message to the EM before receiving the configuration feedback message sent by the EM, where the search message carries an identifier of the VNF, and the search message is used to instruct the EM to search for the configuration feedback message corresponding to the identifier of the VNF.

With reference to the first possible implementation of the seventh aspect, in a third possible implementation, the processor is further configured to send a VNF application parameter configuration notification message to the EM before receiving the configuration feedback message sent by the EM, where the VNF application parameter configuration notification message is used to instruct the EM to configure the application parameter for the VNF.

With reference to the first possible implementation of the seventh aspect, in a fourth possible implementation, the processor is further configured to send a VNF instantiation complete message to the EM before receiving the configuration feedback message sent by the EM, where the VNF instantiation complete message is used to indicate that instantiation of the VNF is completed.

With reference to the seventh aspect, in a fifth possible implementation, the management node is a VNFM; and if the configuration feedback message received by the processor indicates that the application parameter of the VNF is successfully configured, the processing policy determined by the processor is that the processor sends a VNF instantiation complete message to an NM by using an NFVO, and the NM instructs, according to the VNF instantiation complete message, the NFVO to use the VNF to constitute an NS; or if the configuration feedback message received by the processor indicates that the application parameter of the VNF fails to be configured, the processing policy determined by the processor is that the processor instructs the NFVO to release a resource occupied by the VNF.

According to an eighth aspect, the present disclosure provides an EM. The EM includes a processor, configured to send an application parameter configuration message to a VNF, receive a configuration feedback message sent by the VNF, and send the configuration feedback message to a management node, where the application parameter configuration message is used to instruct the VNF to configure an application parameter of the VNF, the configuration feedback message is used to indicate whether the application parameter of the VNF is successfully configured, the configuration feedback message is used by the management node to determine a processing policy for the VNF, and the processing policy is used by the management node to process the VNF.

In a first possible implementation of the eighth aspect, the management node is an NM; the processor is further configured to receive, before sending the configuration feedback message to the NM, a search message sent by the NM, where the search message carries an identifier of the VNF, and the search message is used to instruct the processor to search for the configuration feedback message corresponding to the identifier of the VNF; and the processor is specifically configured to search, according to the identifier of the VNF, for the configuration feedback message corresponding to the identifier of the VNF from multiple saved configuration feedback messages.

With reference to the eighth aspect, in a second possible implementation, the management node is an NM; the processor is further configured to receive, before sending the application parameter configuration message to the VNF, a VNF application parameter configuration notification message sent by the NM, where the VNF application parameter configuration notification message is used to instruct the processor to configure the application parameter for the VNF; and the processor is specifically configured to send the configuration feedback message to the NM.

With reference to the eighth aspect, in a third possible implementation, the management node is an NM; the processor is further configured to receive, before sending the application parameter configuration message to the VNF, a VNF instantiation complete message sent by the NM or a VNFM, where the VNF instantiation complete message is used to indicate that instantiation of the VNF is completed; and the processor is specifically configured to send the configuration feedback message to the NM.

With reference to the eighth aspect, in a fourth possible implementation, the management node is a VNFM; the processor is further configured to receive, before sending the application parameter configuration message to the VNF, a VNF instantiation complete message sent by the VNFM, where the VNF instantiation complete message is used to indicate that instantiation of the VNF is completed; and the processor is specifically configured to send the configuration feedback message to the VNFM.

According to a ninth aspect, the present disclosure provides a VNF. The VNF includes a processor, configured to receive an application parameter configuration message sent by an EM, generate a configuration feedback message according to a result of configuring an application parameter by the VNF, and send the configuration feedback message to the EM, where the EM sends the configuration feedback message to a management node, the application parameter configuration message is used to instruct the processor to configure the application parameter of the VNF, the configuration feedback message is used to indicate whether the application parameter of the VNF is successfully configured, the configuration feedback message is used by the management node to determine a processing policy for the VNF, and the processing policy is used by the management node to process the VNF.

In a first possible implementation of the ninth aspect, the configuration feedback message generated by the processor carries an identifier of the VNF, and the identifier of the VNF is allocated by the EM, the management node, or an NFVO to the VNF.

According to a tenth aspect, the present disclosure provides a communications system. The system includes the management node according to any one of the fourth aspect or the possible implementations of the fourth aspect, the EM according to any one of the fifth aspect or the possible implementations of the fifth aspect, and the VNF according to the sixth aspect or the first possible implementation of the sixth aspect; or the management node according to any one of the seventh aspect or the possible implementations of the seventh aspect, the EM according to any one of the eighth aspect or the possible implementations of the eighth aspect, and the VNF according to the ninth aspect or the first possible implementation of the ninth aspect.

The present disclosure provides a VNF processing policy determining method, an apparatus, and a system, and the method specifically includes: receiving, by a management node, a configuration feedback message sent by an EM, and determining, by the management node, a processing policy for the VNF according to the configuration feedback message. The configuration feedback message is used to indicate whether an application parameter of the VNF is successfully configured, and the processing policy is used by the management node to process the VNF. According to the VNF processing policy determining method, the apparatus, and the system provided in the present disclosure, the management node can learn of a configuration result of the application parameter of the VNF according to the configuration feedback message sent by the EM, and determine the corresponding processing policy for the VNF according to the configuration result, that is, whether the application parameter of the VNF is successfully configured or not. Consequently, this avoids a problem that an NS constituted by the VNF cannot normally run when the EM fails to configure the application parameter for the VNF and an NM still considers that the VNF can normally run.

BRIEF DESCRIPTION OF THE DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure.

DETAILED DESCRIPTION OF ILLUSTRATIVE EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure.

Figures 1, 2:
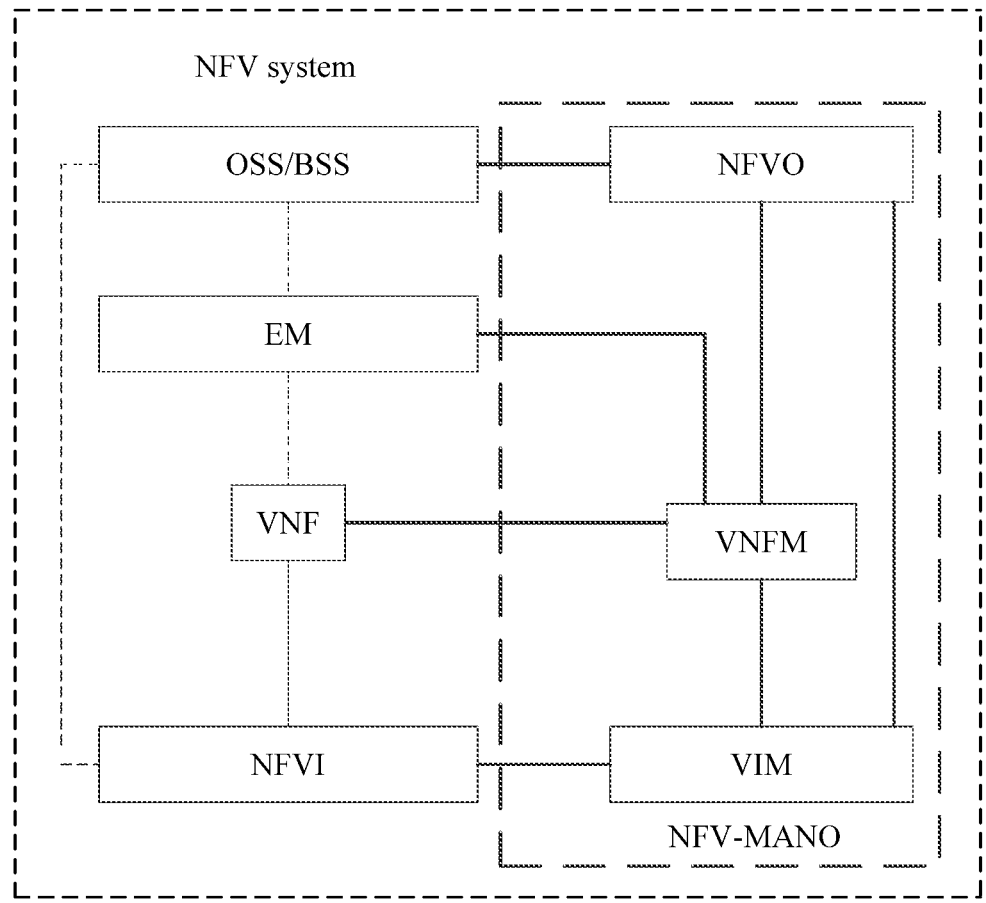
FIG. 1 is a block diagram of an NFV system according to an embodiment of the present disclosure.
FIG. 2 is a first flowchart of a VNF processing policy determining method according to an embodiment of the present disclosure.

Before a VNF processing policy determining method provided in the embodiments of the present disclosure is described, a system related to the VNF processing policy determining method provided in the embodiments of the present disclosure is briefly described first. As shown in FIG. 1, FIG. 1 is a block diagram of an NFV system according to an embodiment of the present disclosure.

The NFV system mainly includes an NFVO, a VNFM, a virtualized infrastructure manager (VIM for short), an operations support system (OSS for short) or a business support system (BSS for short), an EM, a VNF node, and a network functions virtualization infrastructure (NFVI for short). The NFVO, the VNFM, and the VIM form an NFV management and orchestration (NFV-MANO for short) domain.

The NFVO is used for performing deployment, operation, management, and coordination on the VNF and an NFVI corresponding to the VNF, and is used for managing an NS life cycle.

The VIM is a management entry for an infrastructure and a resource, and can provide functions such as configuration maintenance, resource monitoring, alarm, and performance management of virtualized resources and hardware related to the infrastructure.

The NFVI is a generic term of calculation, storage, and network resources required for network functions virtualization.

The VNFM is used for managing a life cycle of the VNF, for example, instantiation, extension or contraction, query, update, and termination.

It should be noted that the VNF described in the embodiments of the present disclosure refers to a VNF node for which the VNFM has configured a deployment parameter, that is, completion of VNF instantiation described in the embodiments of the present disclosure may be understood as completion of configuring the deployment parameter by the VNFM for the VNF. The instantiated VNF may be understood as a VNF node for which an EM has configured an application parameter, and the VNF node can implement a corresponding function. For example, the VNF node is a node that runs on a virtual machine (VM for short) and that can implement an SGW function.

The EM is used for performing application-related parameter configuration on all VNFs in the NFV system.

An NM is used for managing the NS life cycle, for example, instantiation, extension or contraction, query, update, and termination.

It should be noted that the NM in the embodiments of the present disclosure may be specifically an OSS or a BSS, or a user operating interface of an OSS or a BSS.

In the embodiments of the present disclosure, the NFV system may be applied to a Long Term Evolution (LTE for short) communications system, or may be applied to an evolved LTE communications system such as an LTE-A (Long Term Evolution Advanced) system. This is not limited in the present disclosure.

Embodiment 1

An embodiment of the present disclosure provides a VNF processing policy determining method. As shown in FIG. 2, the method may include the following steps.

S101. A management node receives a configuration feedback message sent by an EM, where the configuration feedback message is used to indicate whether an application parameter of a VNF is successfully configured.

The configuration feedback message includes information indicating that the application parameter of the VNF is successfully configured, or includes information indicating that the application parameter of the VNF fails to be configured. For example, a specific flag bit may be set in the configuration feedback message. When the flag bit is 1, the configuration feedback message is used to indicate that the application parameter of the VNF is successfully configured. When the flag bit is 0, the configuration feedback message is used to indicate that the application parameter of the VNF fails to be configured.

S102. The management node determines a processing policy for the VNF according to the configuration feedback message, where the processing policy is used by the management node to process the VNF.

It should be noted that, in this embodiment of the present disclosure, the management node may be an NM or a VNFM. The configuration feedback message received by the management node may carry an identifier of the VNF, so that after receiving the configuration feedback message, the management node can determine the processing policy for the VNF according to the configuration feedback message. The VNF is a VNF corresponding to the identifier of the VNF that is carried in the configuration feedback message.

The configuration feedback message may be a response message returned to an EM after the VNF receives an application parameter configuration message sent by the EM. That is, after receiving the application parameter configuration message sent by the EM, the VNF configures the application parameter of the VNF according to the application parameter configuration message, generates the configuration feedback message according to a configuration result, and sends the configuration feedback message to the EM. Then, the EM forwards the configuration feedback message to the management node.

Further, the processing policy may be used by the management node to instruct an NFVO to perform corresponding processing on the VNF.

Specifically, in a first aspect, when the management node is an NM, after the NM receives the configuration feedback message, if the configuration feedback message indicates that the application parameter of the VNF is successfully configured, the processing policy determined by the NM for the VNF according to the configuration feedback message may be that the NM instructs the NFVO to use the VNF to constitute an NS. That is, after the NM receives the configuration feedback message, if the NM determines, according to the configuration feedback message, that the application parameter of the VNF is successfully configured, the NM determines to instruct the NFVO to use the VNF to constitute an NS.

That the NM instructs the NFVO to use the VNF to constitute an NS may be understood as the following operations: The NM instructs the NFVO to instantiate a non-instantiated NS, so that the VNF constitutes the NS, and instantiation of the NS is implemented. Alternatively, the NM instructs the NFVO to extend an instantiated NS, so that the VNF becomes a composition part of the NS, that is, the VNF constitutes the NS. Alternatively, the NM instructs the NFVO to update an instantiated NS, so that the VNF replaces a VNF constituting the NS, and the VNF constitutes the NS. To better describe a specific process that the NM instructs the NFVO to use the VNF to constitute an NS in this embodiment of the present disclosure, the following describes an example that the NM instructs the NFVO to instantiate an NS.

For example, when the NM needs to instantiate the NS constituted by the VNF, the NM may send an NS instantiation request message to the NFVO, to request the NFVO to instantiate the NS. The NS instantiation request message carries instantiation information of the NS. After the NFVO receives the NS instantiation request message, the NFVO performs, according to the NS instantiation request message, a related connection operation on multiple VNFs that meet the instantiation information of the NS, so that the multiple VNFs constitute the NS, and the instantiation of the NS is implemented. The VNF is one of the multiple VNFs that meet the instantiation information of the NS. That is, the NM instructs the NFVO to use the VNF to constitute the NS.

Further, in this embodiment of the present disclosure, after receiving the configuration feedback message sent by the EM, and determining, according to the configuration feedback message, that the application parameter of the VNF is successfully configured, the NM determines to instruct the NFVO to use the VNF to constitute the NS. That the application parameter is successfully configured indicates that the VNF can normally run. Therefore, when the NM instructs the NFVO to use the VNF to constitute the NS, because the VNF can normally run, normal running of the NS can be ensured. Consequently, this avoids a prior art problem that an NS cannot normally run if an NM instructs an NFVO to use a VNF, whose application parameter fails to be configured, to constitute the NS, that is, to use the VNF that cannot normally run to constitute the NS.

In a second aspect, after the NM receives the configuration feedback message, if the configuration feedback message indicates that the application parameter of the VNF fails to be configured, the processing policy determined by the NM for the VNF according to the configuration feedback message may be that the NM instructs the NFVO to release a resource occupied by the VNF. That is, if the NM determines, according to the configuration feedback message, that the application parameter of the VNF fails to be configured, the NM may instruct the NFVO to release the resource occupied by the VNF.

A specific process that the NM instructs the NFVO to release the resource occupied by the VNF may be as follows: The NM sends a resource release instruction message to the NFVO, to instruct the NFVO to release the resource occupied by the VNF. After the NFVO receives the resource release instruction message, the NFVO sends the resource release instruction message to a VIM, to request the VIM to release, according to the resource release instruction message, the resource occupied by the VNF. The resource occupied by the VNF may include resources such as a VM and virtual connection allocated to the VNF in an instantiation process of the VNF.

Further, in the prior art, if an EM fails to configure an application parameter for a VNF, the VNF cannot normally run. Because the VNF has occupied a resource in an instantiation process, even if the VNF cannot normally run, the VNF still occupies the resource. Consequently, the resource cannot be fully used, and then a waste of resource is caused. However, in this embodiment of the present disclosure, after the NM receives the configuration feedback message sent by the EM, and determines, according to the configuration feedback message, that the application parameter of the VNF fails to be configured, the NM can instruct, in a timely manner, the NFVO to release the resource occupied by the VNF. Consequently, this avoids a prior art problem of a waste of resource occupied by a VNF whose application parameter fails to be configured. Then, the resource may be fully used, and resource utilization is improved.

In a third aspect, when the management node is a VNFM, after the VNFM receives the configuration feedback message, if the configuration feedback message indicates that the application parameter of the VNF is successfully configured, the processing policy determined by the VNFM for the VNF according to the configuration feedback message may be that the VNFM sends a VNF instantiation complete message to an NM by using the NFVO, and the NM instructs, according to the VNF instantiation complete message, the NFVO to use the VNF to constitute an NS. That is, if the VNFM determines, according to the configuration feedback message, that the application parameter of the VNF is successfully configured, the VNFM sends the VNF instantiation complete message to the NFVO, and the NFVO sends the VNF instantiation complete message to the NM, so that the NM may determine, according to the VNF instantiation complete message, that instantiation of the VNF is completed and the application parameter of the VNF is successfully configured, and then the NM may instruct the NFVO to use the VNF to constitute the NS.

Further, in this embodiment of the present disclosure, after determining that the application parameter of the VNF is successfully configured, the VNFM notifies the NM that the instantiation of the VNF is completed, that is, the VNF can normally run. Consequently, when the NM uses the VNF to constitute the related NS, normal running of the NS constituted by the VNF can be ensured. Therefore, this avoids a prior art problem, and the problem is as follows: When a VNFM does not know for sure whether an application parameter of an instantiated VNF is successfully configured, the VNFM notifies an NM that instantiation of the VNF is completed, and therefore, the NM probably instructs an NFVO to use a VNF, whose application parameter fails to be configured, to constitute an NS, and then the NS cannot normally run.

In a fourth aspect, after the VNFM receives the configuration feedback message, if the configuration feedback message indicates that the application parameter of the VNF fails to be configured, the processing policy determined by the VNFM for the VNF according to the configuration feedback message may be that the VNFM instructs the NFVO to release a resource occupied by the VNF. That is, if the VNFM determines, according to the configuration feedback message, that the application parameter of the VNF fails to be configured, the VNFM may instruct the NFVO to release the resource occupied by the VNF.

A manner of instructing, by the VNFM, the NFVO to release the resource occupied by the VNF is the same as the manner of instructing, by the NM, the NFVO to release the resource occupied by the VNF. For details, refer to the manner of instructing, by the NM, the NFVO to release the resource occupied by the VNF, and the details are not described herein.

Further, in this embodiment of the present disclosure, after the VNFM receives the configuration feedback message sent by the EM, and determines, according to the configuration feedback message, that the application parameter of the VNF fails to be configured, the VNFM can instruct, in a timely manner, the NFVO to release the resource occupied by the VNF. Consequently, this avoids a prior art problem of a waste of resource occupied by a VNF whose application parameter fails to be configured. Then, the resource may be fully used, and resource utilization is improved.

This embodiment of the present disclosure provides a VNF processing policy determining method, and the method may include: receiving, by a management node, a configuration feedback message sent by an EM, and determining, by the management node, a processing policy for the VNF according to the configuration feedback message. The configuration feedback message is used to indicate whether an application parameter of the VNF is successfully configured, and the processing policy is used by the management node to process the VNF. According to this method, the management node can learn of a configuration result of the application parameter of the VNF according to the configuration feedback message sent by the EM, and determine the corresponding processing policy for the VNF according to the configuration result, that is, whether the application parameter of the VNF is successfully configured or not. Consequently, this avoids a problem that an NS constituted by the VNF cannot normally run when the EM fails to configure the application parameter for the VNF and an NM still considers that the VNF can normally run.

Figure 3:
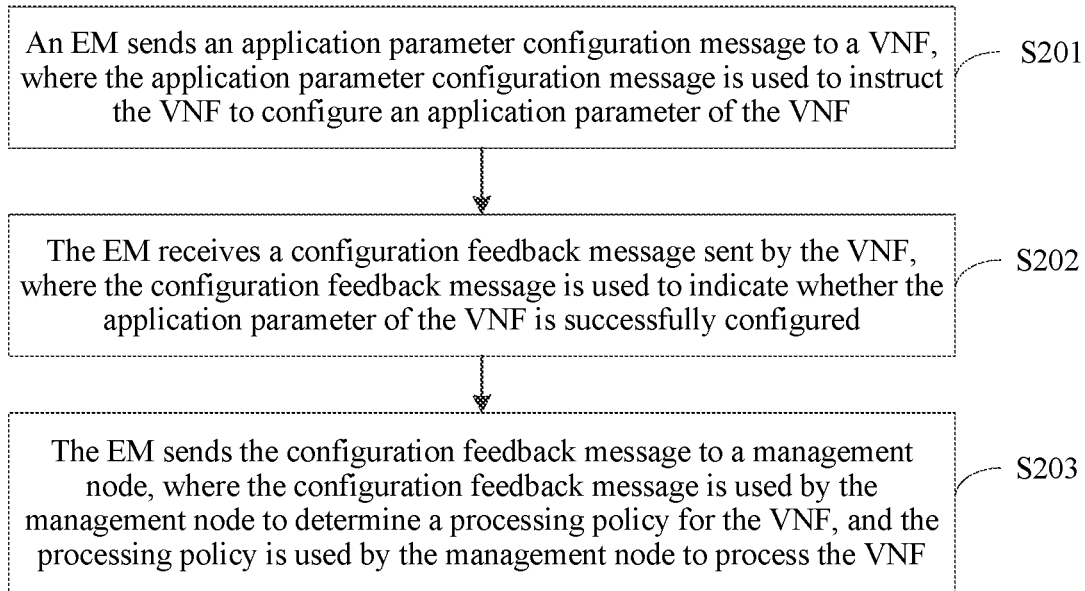
FIG. 3 is a second flowchart of a VNF processing policy determining method according to an embodiment of the present disclosure.

An embodiment of the present disclosure provides a VNF processing policy determining method. As shown in FIG. 3, the method may include the following steps.

S201. An EM sends an application parameter configuration message to a VNF, where the application parameter configuration message is used to instruct the VNF to configure an application parameter of the VNF.

Specifically, in this embodiment of the present disclosure, the EM may send the application parameter configuration message to the VNF in the following two possible application scenarios.

Optionally, in a first possible application scenario, after receiving a VNF instantiation complete message, the EM may determine that the application parameter needs to be configured for the VNF, and then the EM may send the application parameter configuration message to the VNF, to instruct the VNF to configure the application parameter of the VNF according to the application parameter configuration message. The VNF instantiation complete message received by the EM may be sent by a VNFM to the EM, or may be sent by an NM to the EM.

Optionally, in a second possible application scenario, if an NM receives a VNF instantiation complete message sent by a VNFM, and determines that instantiation of the VNF is completed, when the NM determines that the VNF needs to be used, the NM sends a VNF application parameter configuration notification message to the EM, to instruct the EM to configure the application parameter for the VNF. After receiving the VNF application parameter configuration notification message sent by the NM, the EM determines, according to an instruction of the VNF application parameter configuration notification message, to configure the application parameter for the VNF. Then the EM may send the application parameter configuration message to the VNF, to instruct the VNF to configure the application parameter of the VNF according to the application parameter configuration message.

S202. The EM receives a configuration feedback message sent by the VNF, where the configuration feedback message is used to indicate whether the application parameter of the VNF is successfully configured.

S203. The EM sends the configuration feedback message to a management node, where the configuration feedback message is used by the management node to determine a processing policy for the VNF, and the processing policy is used by the management node to process the VNF.

The management node may be an NM or a VNFM.

Specifically, in this embodiment of the present disclosure, after receiving the configuration feedback message sent by the VNF, the EM may directly send the configuration feedback message to an NM or a VNFM. Alternatively, after receiving the configuration feedback message sent by the VNF, the EM may save a correspondence between the configuration feedback message and an identifier of the VNF that sends the configuration feedback message, and send the configuration feedback message to an NM after receiving a search message sent by the NM. The identifier of the VNF may be carried in the configuration feedback message, or may be saved by the EM.

Further, after the EM receives the search message sent by the NM, the EM may search, according to an identifier of a VNF that is carried in the search message, for a configuration feedback message corresponding to the identifier of the VNF from saved configuration feedback messages sent by multiple VNFs, and send the configuration feedback message to the NM. The search message is used to instruct the EM to search for the configuration feedback message corresponding to the identifier of the VNF that is carried in the search message.

It should be noted that, if the configuration feedback message that is received by the EM and that is sent by the VNF does not carry the identifier of the VNF, the EM may add the identifier of the VNF to the configuration feedback message when the EM sends the configuration feedback message to the management node. Then, after receiving the configuration feedback message sent by the EM, the management node can determine the processing policy for the VNF according to the configuration feedback message. The VNF is a VNF corresponding to the identifier of the VNF that is carried in the configuration feedback message, and the processing policy is used by the management node to process the VNF.

Specifically, for a specific implementation of determining, by the management node, the processing policy for the VNF according to the configuration feedback message, refer to related description in the embodiment shown in FIG. 2. Details are not described herein again.

This embodiment of the present disclosure provides a VNF processing policy determining method, and the method may include: sending, by an EM, an application parameter configuration message to a VNF, receiving a configuration feedback message sent by the VNF, and sending the configuration feedback message to a management node. The application parameter configuration message is used to instruct the VNF to configure an application parameter of the VNF. The configuration feedback message is used to indicate whether the application parameter of the VNF is successfully configured. The configuration feedback message is used by the management node to determine a processing policy for the VNF, and the processing policy is used by the management node to process the VNF. According to this method, the EM can receive the configuration feedback message sent by the VNF, and send the configuration feedback message to the management node, so that the management node can learn of a configuration result of the application parameter of the VNF according to the configuration feedback message, and determine the corresponding processing policy for the VNF according to the configuration result, that is, whether the application parameter of the VNF is successfully configured or not. Consequently, this avoids a problem that an NS constituted by the VNF cannot normally run when the EM fails to configure the application parameter for the VNF and an NM still considers that the VNF can normally run.

Figure 4:
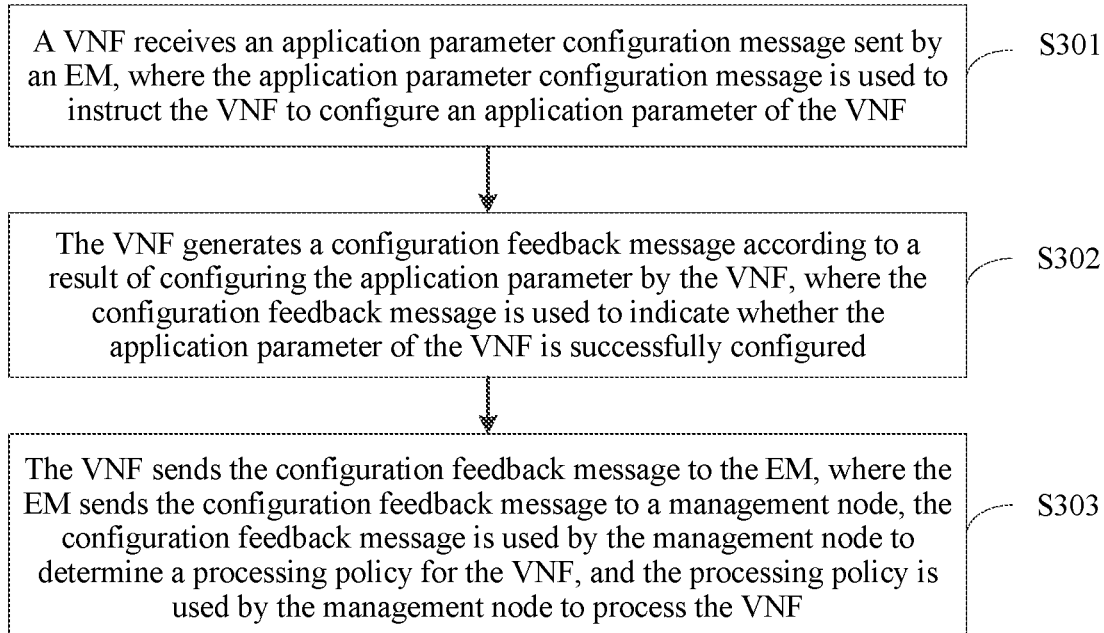
FIG. 4 is a third flowchart of a VNF processing policy determining method according to an embodiment of the present disclosure.

An embodiment of the present disclosure provides a VNF processing policy determining method. As shown in FIG. 4, the method may include the following steps.

S301. A VNF receives an application parameter configuration message sent by an EM, where the application parameter configuration message is used to instruct the VNF to configure an application parameter of the VNF.

S302. The VNF generates a configuration feedback message according to a result of configuring the application parameter by the VNF, where the configuration feedback message is used to indicate whether the application parameter of the VNF is successfully configured.

In this embodiment of the present disclosure, after receiving the application parameter configuration message sent by the EM, the VNF configures the application parameter of the VNF according to the application parameter configuration message. Configuration of the application parameter of the VNF may succeed or fail, that is, the result of configuring the application parameter by the VNF may be that the application parameter of the VNF is successfully configured, or may be that the application parameter of the VNF fails to be configured. Therefore, when the application parameter of the VNF is successfully configured, the VNF may generate a configuration feedback message that includes information indicating that the application parameter of the VNF is successfully configured, to indicate that the application parameter of the VNF is successfully configured. When the application parameter of the VNF fails to be configured, the VNF may generate a configuration feedback message that includes information indicating that the application parameter of the VNF fails to be configured, to indicate that the application parameter of the VNF fails to be configured.

S303. The VNF sends the configuration feedback message to the EM, where the EM sends the configuration feedback message to a management node, the configuration feedback message is used by the management node to determine a processing policy for the VNF, and the processing policy is used by the management node to process the VNF.

Further, after generating the configuration feedback message, the VNF sends the configuration feedback message to the EM, and the EM sends the configuration feedback message to the management node, so that the management node determines the processing policy for the VNF according to the configuration feedback message.

For a specific manner of determining, by the management node, the processing policy for the VNF according to the configuration feedback message, refer to related description in the embodiment shown in FIG. 2. Details are not described herein again.

Optionally, the configuration feedback message may carry an identifier of the VNF, so that the EM can determine a correspondence between the configuration feedback message and the VNF according to the identifier of the VNF. The identifier of the VNF may be allocated by the EM to the VNF, or may be allocated by the management node to the VNF, or may be allocated by an NFVO to the VNF.

This embodiment of the present disclosure provides a VNF processing policy determining method, and the method may include: receiving, by a VNF, an application parameter configuration message sent by an EM, generating a configuration feedback message according to a result of configuring an application parameter by the VNF, and sending, by the VNF, the configuration feedback message to the EM. The application parameter configuration message is used to instruct the VNF to configure the application parameter of the VNF, and the configuration feedback message is used to indicate whether the application parameter of the VNF is successfully configured. According to this method, the VNF can generate the configuration feedback message according to the result of configuring the application parameter, and send the configuration feedback message to the EM. After the EM receives the configuration feedback message, the EM sends the configuration feedback message to a management node, so that the management node can learn of the configuration result of the application parameter of the VNF according to the configuration feedback message, and determine a corresponding processing policy for the VNF according to the configuration result, that is, whether the application parameter of the VNF is successfully configured or not. Consequently, this avoids a problem that an NS constituted by the VNF cannot normally run when the EM fails to configure the application parameter for the VNF and an NM still considers that the VNF can normally run.

Embodiment 2

Figure 5:
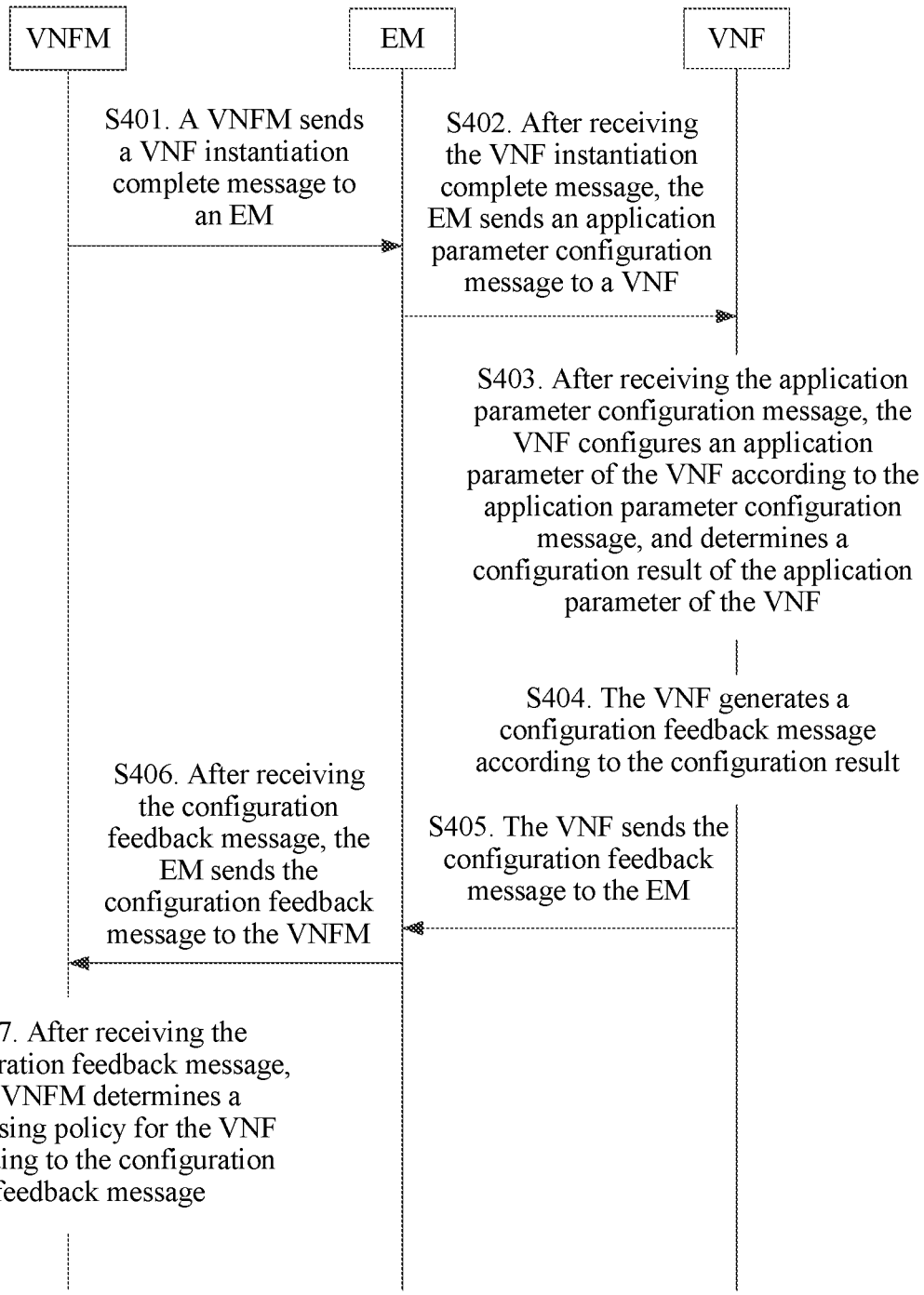
FIG. 5 is a first interaction diagram of a VNF processing policy determining method according to an embodiment of the present disclosure.

An embodiment of the present disclosure provides a VNF processing policy determining method. When a management node is a VNFM, as shown in FIG. 5, the method may include the following steps.

S401. The VNFM sends a VNF instantiation complete message to an EM.

Specifically, after completing instantiation of a VNF, the VNFM sends the VNF instantiation complete message to the EM, to notify the EM that the instantiation of the VNF is completed.

For a specific process of instantiating the VNF by the VNFM, refer to a process, defined in an existing standard, of instantiating the VNF by the VNFM. Details are not described herein.

S402. After receiving the VNF instantiation complete message, the EM sends an application parameter configuration message to a VNF.

It should be noted that, after the EM receives the VNF instantiation complete message and determines that the instantiation of the VNF is completed, the EM may determine that an application parameter needs to be configured for the VNF. Then the EM allocates configuration information of the application parameter to the VNF, adds the allocated configuration information to the application parameter configuration message, and sends the application parameter configuration message to the VNF, to instruct the VNF to configure the application parameter of the VNF according to the configuration information.

S403. After receiving the application parameter configuration message, the VNF configures an application parameter of the VNF according to the application parameter configuration message, and determines a configuration result of the application parameter of the VNF.

Specifically, after receiving the application parameter configuration message, the VNF configures the application parameter of the VNF according to the configuration information that is of the application parameter and that is carried in the application parameter configuration message. Because the EM may allocate wrong configuration information to the VNF, the VNF may fail to configure the application parameter of the VNF according to the configuration information. For example, when a quantity of network connections in the configuration information allocated by the EM to the VNF is greater than a maximum quantity of network connections that can be supported by a resource occupied by the VNF, that is, when the EM allocates, to the VNF, configuration information that cannot be supported by the resource occupied by the VNF, the application parameter of the VNF fails to be configured.

Further, in this embodiment of the present disclosure, after configuring the application parameter of the VNF according to the application parameter configuration message, the VNF determines the configuration result of the application parameter of the VNF. The configuration result is specifically that the application parameter of the VNF is successfully configured, or the application parameter of the VNF fails to be configured.

S404. The VNF generates a configuration feedback message according to the configuration result.

Specifically, if the configuration result is that the application parameter of the VNF is successfully configured, the configuration feedback message generated by the VNF includes information indicating that the application parameter of the VNF is successfully configured, to indicate that the application parameter of the VNF is successfully configured. If the configuration result is that the application parameter of the VNF fails to be configured, the configuration feedback message generated by the VNF includes information indicating that the application parameter of the VNF fails to be configured, to indicate that the application parameter of the VNF fails to be configured.

S405. The VNF sends the configuration feedback message to the EM.

S406. After receiving the configuration feedback message, the EM sends the configuration feedback message to the VNFM.

It should be noted that, if the configuration feedback message that is received by the EM and that is sent by the VNF does not carry an identifier of the VNF, the EM may select the identifier of the VNF from VNF identifiers saved by the EM. When sending the configuration feedback message to the VNFM, the EM may add the identifier of the VNF to the configuration feedback message, and send the configuration feedback message to the VNFM, so that after receiving the configuration feedback message, the VNFM determines, according to the identifier of the VNF, that the configuration feedback message is a configuration feedback message of the VNF. The identifier of the VNF is obtained by the EM from the VNF instantiation complete message after the VNF instantiation complete message sent by the VNFM is received. Alternatively, the identifier of the VNF may be allocated by the EM to the VNF after the VNF instantiation complete message sent by the VNFM is received.

Optionally, if the configuration feedback message that is received by the EM and that is sent by the VNF carries the identifier of the VNF, the EM may directly send the configuration feedback message to the VNFM.

S407. After receiving the configuration feedback message, the VNFM determines a processing policy for the VNF according to the configuration feedback message.

Figure 6:
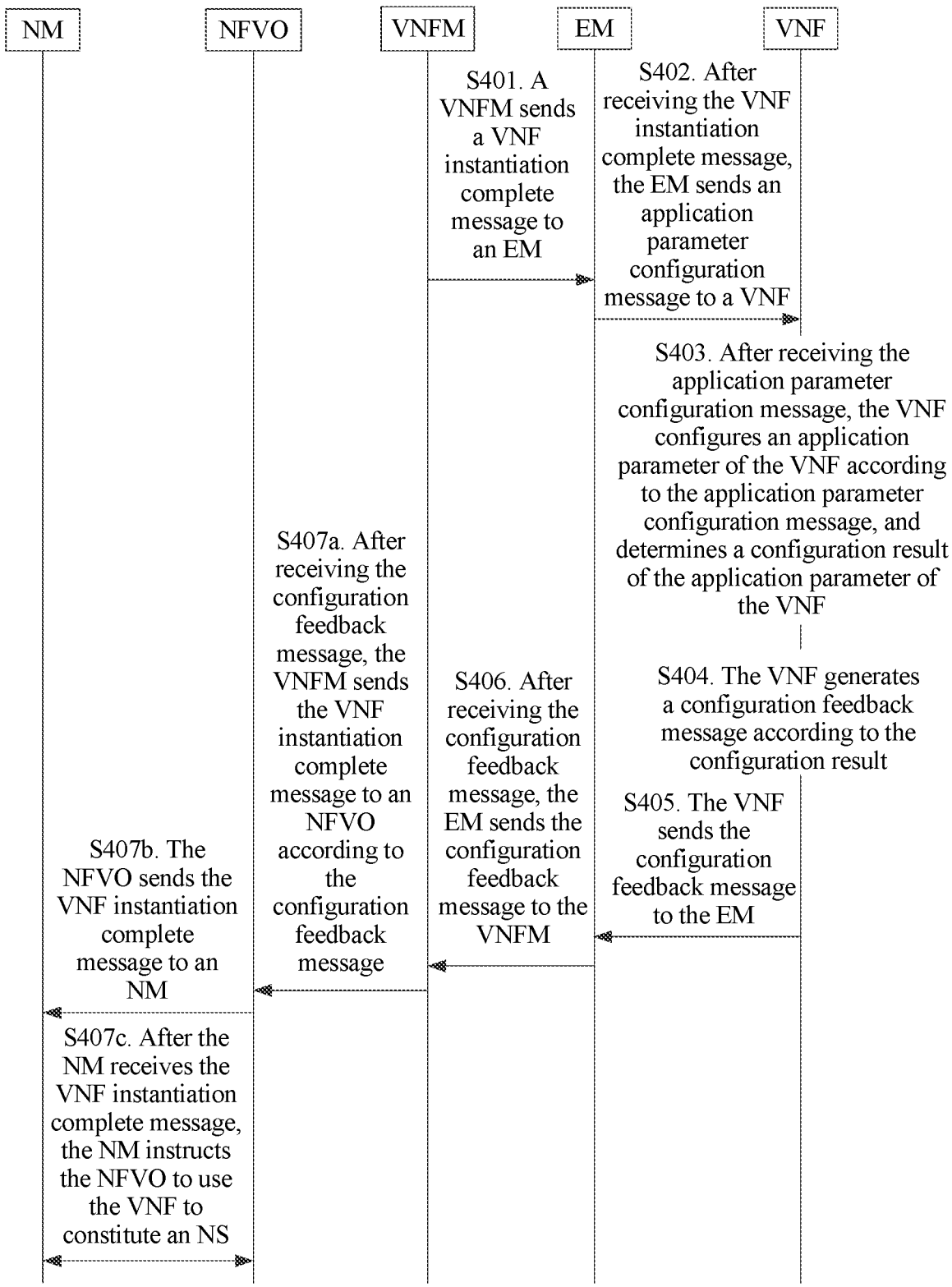
FIG. 6 is a second interaction diagram of a VNF processing policy determining method according to an embodiment of the present disclosure.

Further, if the configuration feedback message indicates that the application parameter of the VNF is successfully configured, with reference to FIG. 5, as shown in FIG. 6, S407 may include the following steps.

S407a. After receiving the configuration feedback message, the VNFM sends the VNF instantiation complete message to an NFVO according to the configuration feedback message.

The VNFM determines, according to the configuration feedback message, that the application parameter of the VNF is successfully configured, and then the VNFM may determine that the VNF instantiation complete message can be sent to the NFVO, to notify the NFVO that the instantiation of the VNF is completed.

S407b. The NFVO sends the VNF instantiation complete message to an NM.

S407c. After the NM receives the VNF instantiation complete message, the NM instructs the NFVO to use the VNF to constitute an NS.

Specifically, for a manner of instructing, by the NM, the NFVO to use the VNF to constitute the NS, refer to related description in the embodiment shown in FIG. 2. Details are not described herein again.

Figure 7:
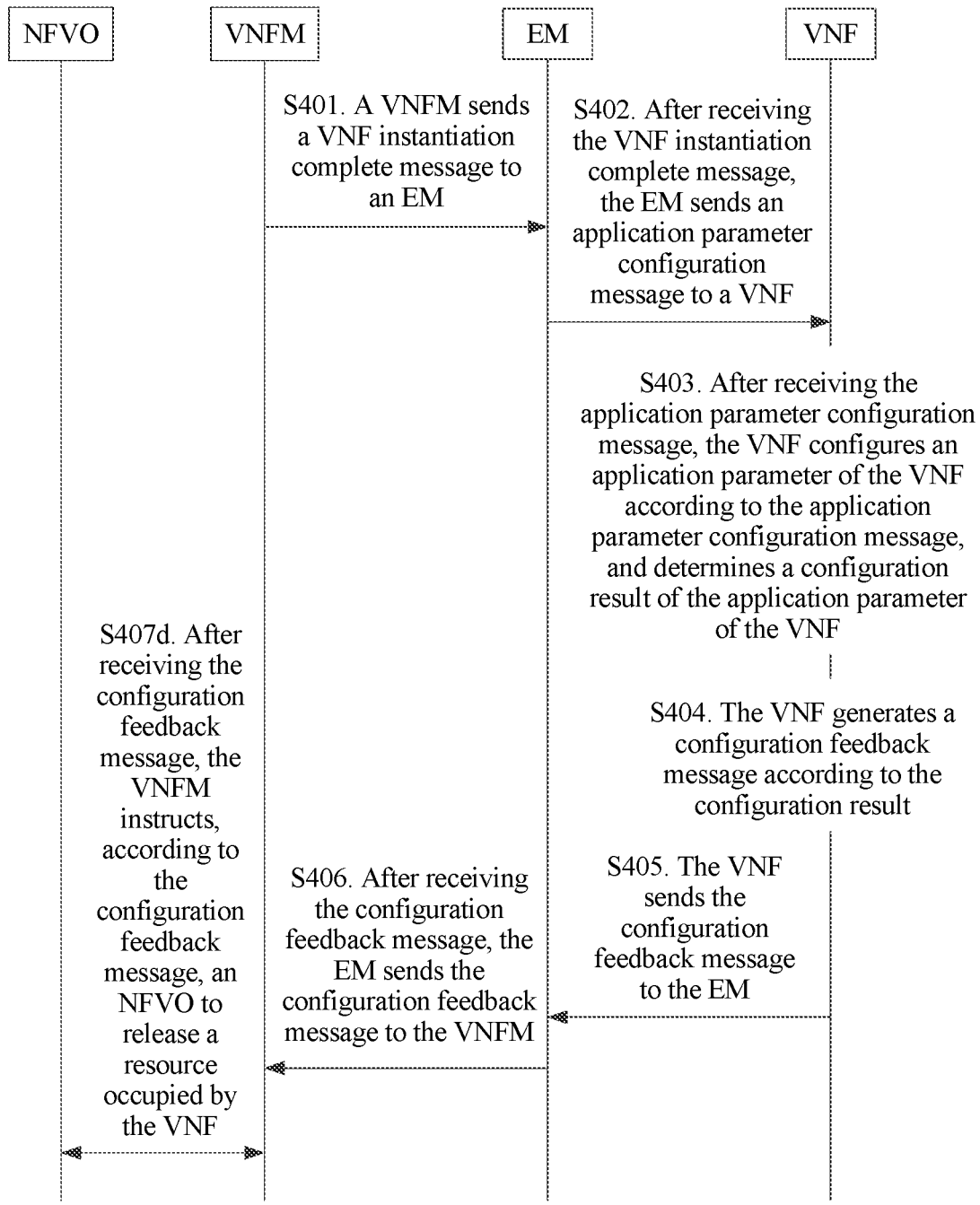
FIG. 7 is a third interaction diagram of a VNF processing policy determining method according to an embodiment of the present disclosure.

If the configuration feedback message indicates that the application parameter of the VNF fails to be configured, with reference to FIG. 5, as shown in FIG. 7, S407 may be as follows:

S407d. After receiving the configuration feedback message, the VNFM instructs, according to the configuration feedback message, an NFVO to release a resource occupied by the VNF.

Specifically, for a manner of instructing, by the VNFM, the NFVO to release the resource occupied by the VNF, refer to related description in the embodiment shown in FIG. 2. Details are not described herein again.

In the VNF processing policy determining method provided in this embodiment of the present disclosure, a VNF can generate a configuration feedback message according to a configuration result of an application parameter, and send the configuration feedback message to an EM, so that the EM sends the configuration feedback message to a VNFM. The VNFM learns of the configuration result of the application parameter of the VNF according to the configuration feedback message, and the VNFM determines a processing policy for the VNF according to the configuration result. That is, when the application parameter of the VNF is successfully configured, the VNFM can notify an NM to instruct an NFVO to use the VNF to constitute an NS, so as to avoid a problem that the NS constituted by the VNF cannot normally run when the EM fails to configure the application parameter for the VNF. In addition, when the application parameter of the VNF fails to be configured, the VNFM instructs the NFVO to release a resource occupied by the VNF, so as to avoid a problem of a waste of resource occupied by a VNF whose application parameter fails to be configured. Then, the resource may be fully used, and resource utilization is improved.

Figure 8:
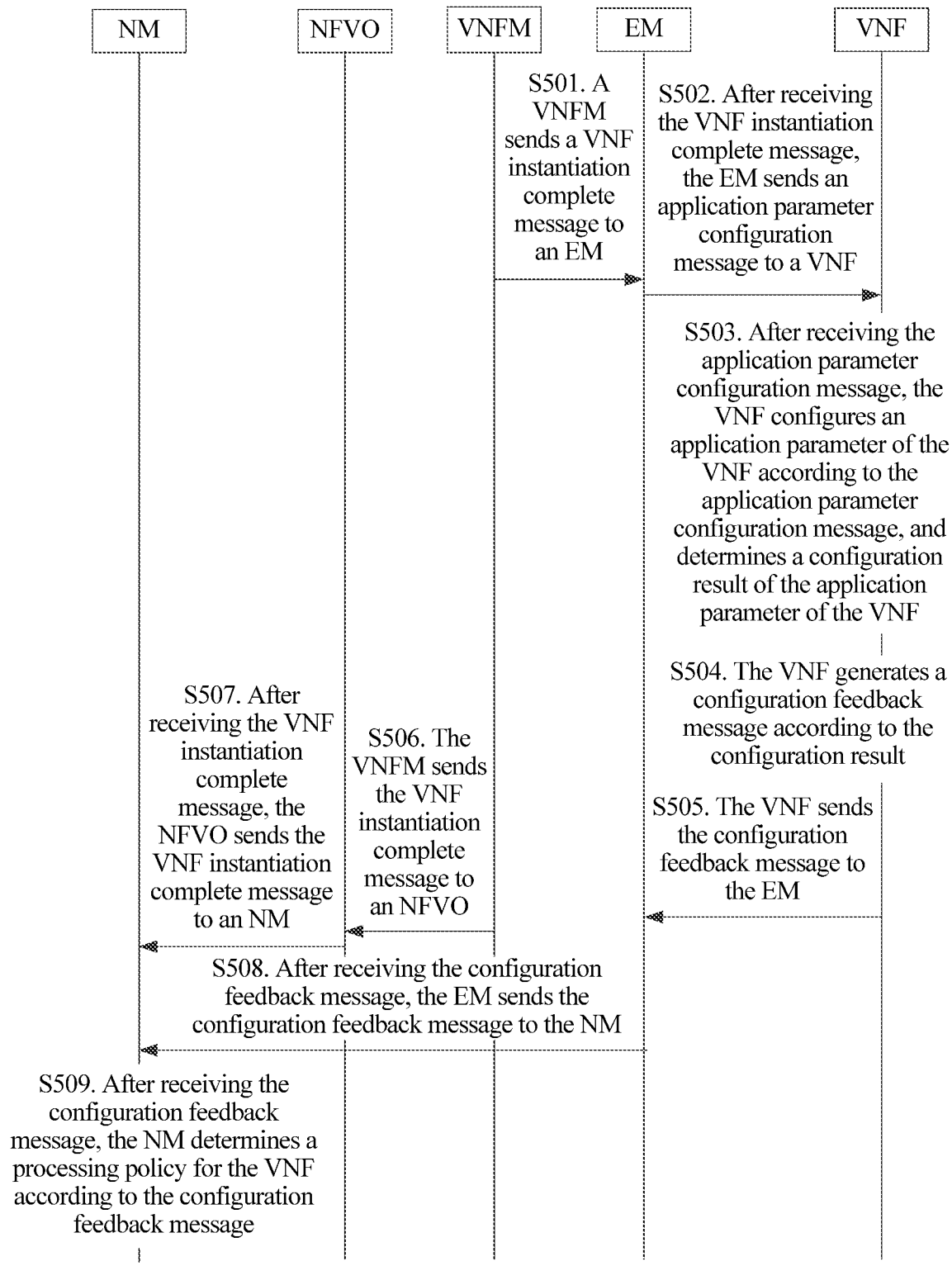
FIG. 8 is a fourth interaction diagram of a VNF processing policy determining method according to an embodiment of the present disclosure.

An embodiment of the present disclosure provides a VNF processing policy determining method. When a management node is an NM, as shown in FIG. 8, the method may include the following steps.

S501. A VNFM sends a VNF instantiation complete message to an EM.

S502. After receiving the VNF instantiation complete message, the EM sends an application parameter configuration message to a VNF.

S503. After receiving the application parameter configuration message, the VNF configures an application parameter of the VNF according to the application parameter configuration message, and determines a configuration result of the application parameter of the VNF.

S504. The VNF generates a configuration feedback message according to the configuration result.

S505. The VNF sends the configuration feedback message to the EM.

Specifically, implementations of S501 to S505 in this embodiment of the present disclosure are the same as implementations of S401 to S405. For details, refer to related description of S401 to S405. Details are not described herein again.

S506. The VNFM sends the VNF instantiation complete message to an NFVO.

S507. After receiving the VNF instantiation complete message, the NFVO sends the VNF instantiation complete message to the NM.

It should be noted that, in this embodiment of the present disclosure, S506 to S507 may be performed after S500 and before S502, or may be performed after S502. This is not limited in this embodiment of the present disclosure.

S508. After receiving the configuration feedback message, the EM sends the configuration feedback message to the NM.

In this embodiment of the present disclosure, after the EM receives the configuration feedback message sent by the VNF, the EM may directly send the configuration feedback message to the NM, so that the NM determines a processing policy for the VNF according to the configuration feedback message. If the configuration feedback message that is received by the EM and that is sent by the VNF does not carry an identifier of the VNF, the EM may select the identifier of the VNF from VNF identifiers saved by the EM. When sending the configuration feedback message to the NM, the EM may add the identifier of the VNF to the configuration feedback message, and send the configuration feedback message to the NM, so that after receiving the configuration feedback message, the NM determines, according to the identifier of the VNF, that the configuration feedback message is a configuration feedback message of the VNF. If the configuration feedback message that is received by the EM and that is sent by the VNF carries the identifier of the VNF, the EM may directly send the configuration feedback message to the NM.

S509. After receiving the configuration feedback message, the NM determines a processing policy for the VNF according to the configuration feedback message.

Figure 9:
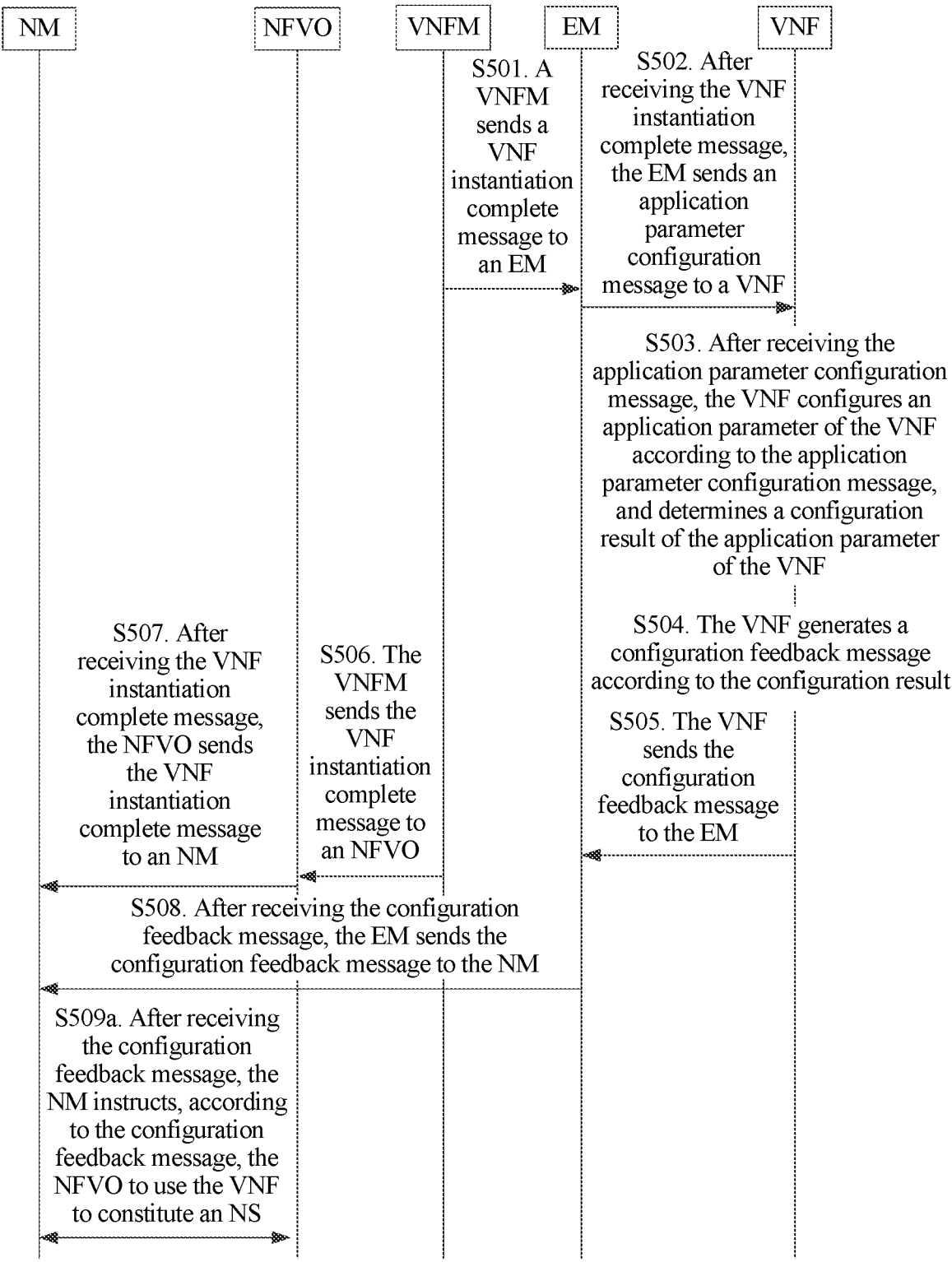
FIG. 9 is a fifth interaction diagram of a VNF processing policy determining method according to an embodiment of the present disclosure.

Further, if the configuration feedback message indicates that the application parameter of the VNF is successfully configured, with reference to FIG. 8, as shown in FIG. 9, S509 may be as follows:

S509a. After receiving the configuration feedback message, the NM instructs, according to the configuration feedback message, the NFVO to use the VNF to constitute an NS.

Specifically, for a manner of instructing, by the NM, the NFVO to use the VNF to constitute the NS, refer to related description in the embodiment shown in FIG. 2. Details are not described herein again.

Figure 10A:
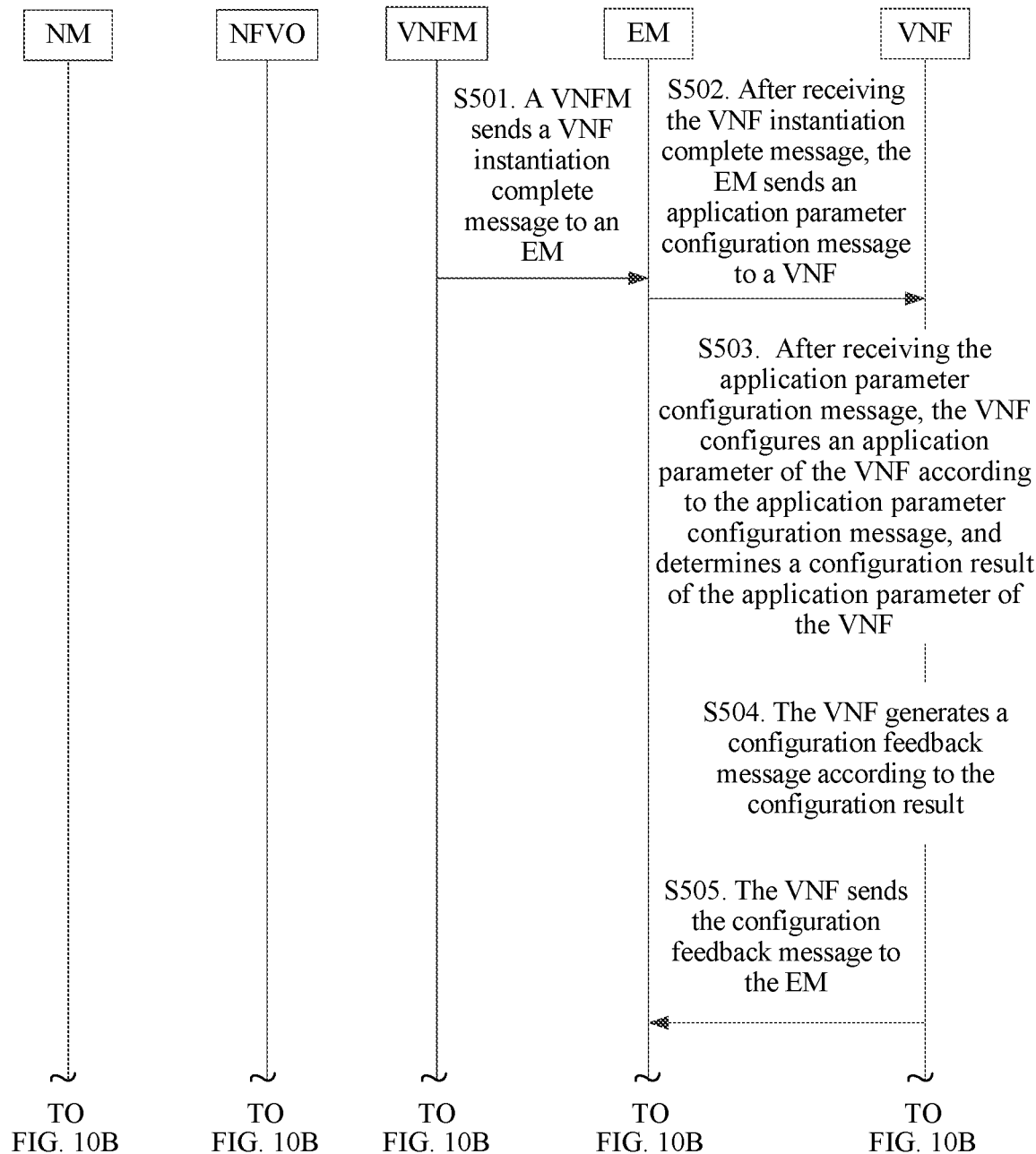
FIG. 10A and FIG. 10B are a sixth interaction diagram of a VNF processing policy determining method according to an embodiment of the present disclosure.
Figure 10B:
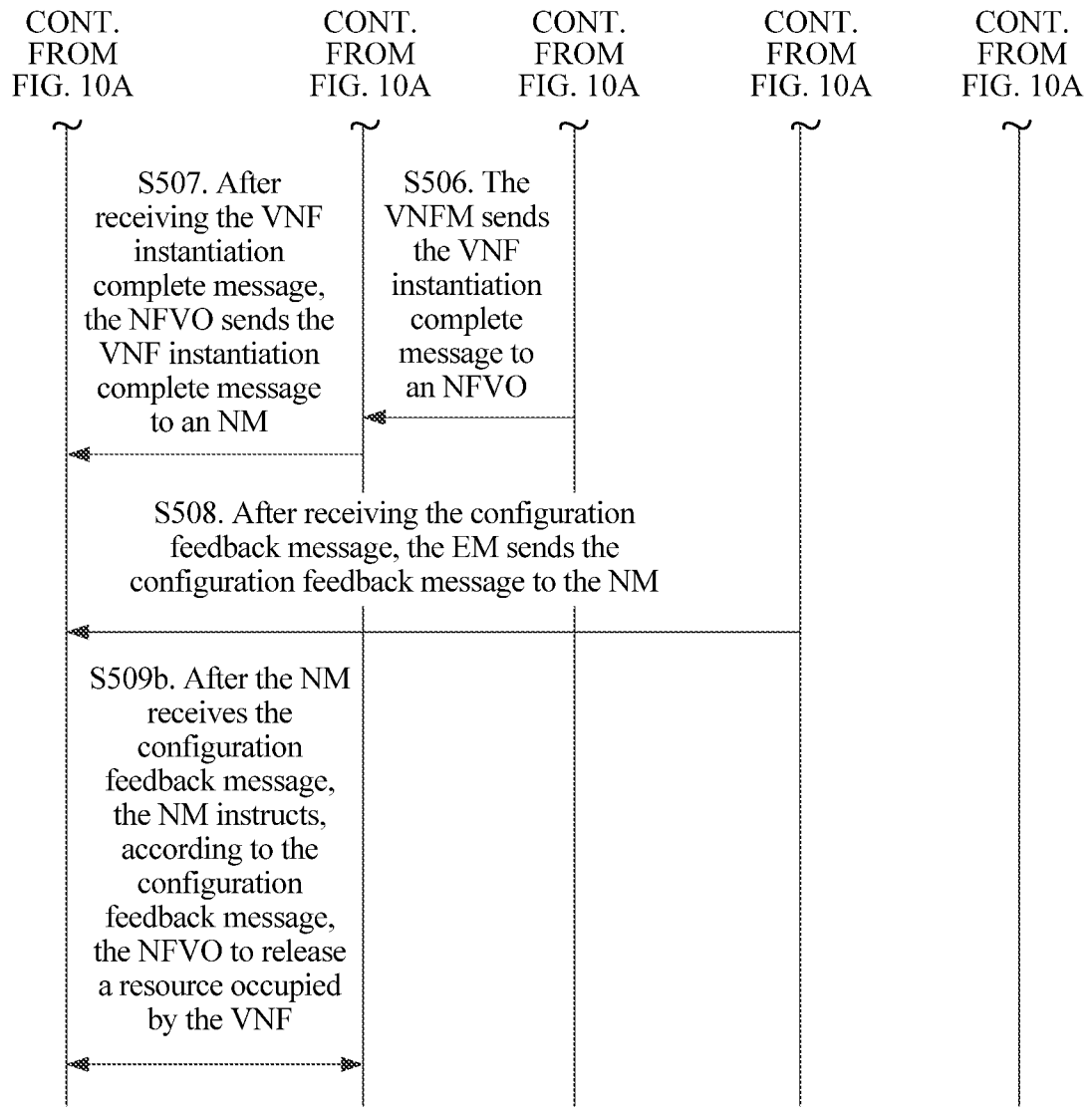

Further, if the configuration feedback message indicates that the application parameter of the VNF fails to be configured, with reference to FIG. 8, as shown in FIG. 10A and FIG. 10B, S509 may be as follows.

S509b. After the NM receives the configuration feedback message, the NM instructs, according to the configuration feedback message, the NFVO to release a resource occupied by the VNF.

Specifically, for a manner of instructing, by the NM, the NFVO to release the resource occupied by the VNF, refer to related description in the embodiment shown in FIG. 2. Details are not described herein again.

In the VNF processing policy determining method provided in this embodiment of the present disclosure, a VNF can generate a configuration feedback message according to a configuration result of an application parameter, and send the configuration feedback message to an EM, so that the EM sends the configuration feedback message to an NM. When determining that instantiation of the VNF is completed, the NM learns of the configuration result of the application parameter of the VNF according to the configuration feedback message, and determines a processing policy for the VNF according to the configuration result, so as to avoid a problem that an NS constituted by the VNF whose application parameter fails to be configured cannot normally run when the NM instructs an NFVO to use the VNF to constitute the NS. In addition, when the application parameter of the VNF fails to be configured, the NM instructs the NFVO to release a resource occupied by the VNF, so as to avoid a problem of a waste of resource occupied by a VNF whose application parameter fails to be configured. Then, the resource may be fully used, and resource utilization is improved.

Figure 11A:
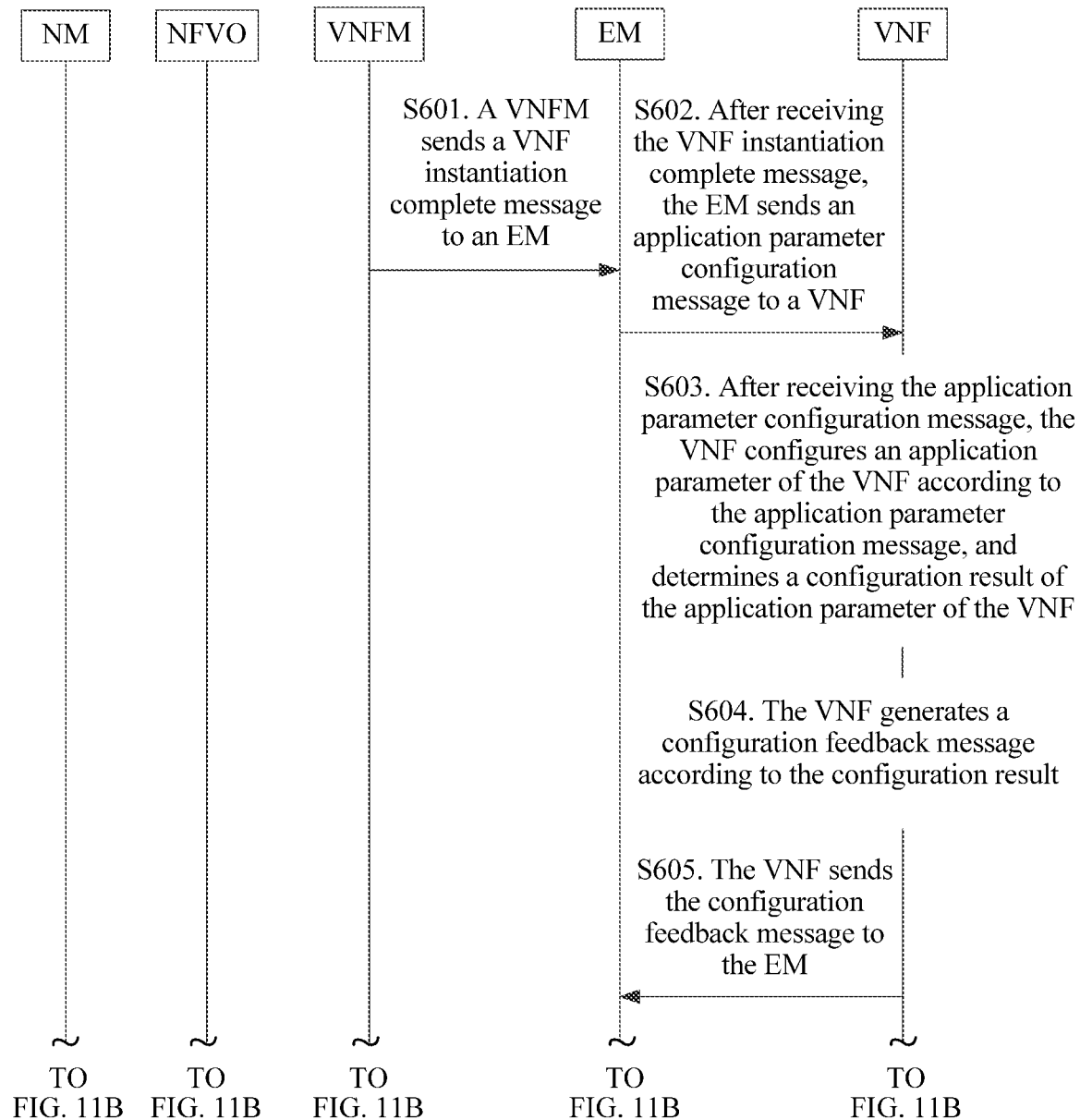
FIG. 11A and FIG. 11B are a seventh interaction diagram of a VNF processing policy determining method according to an embodiment of the present disclosure.
Figure 11B:
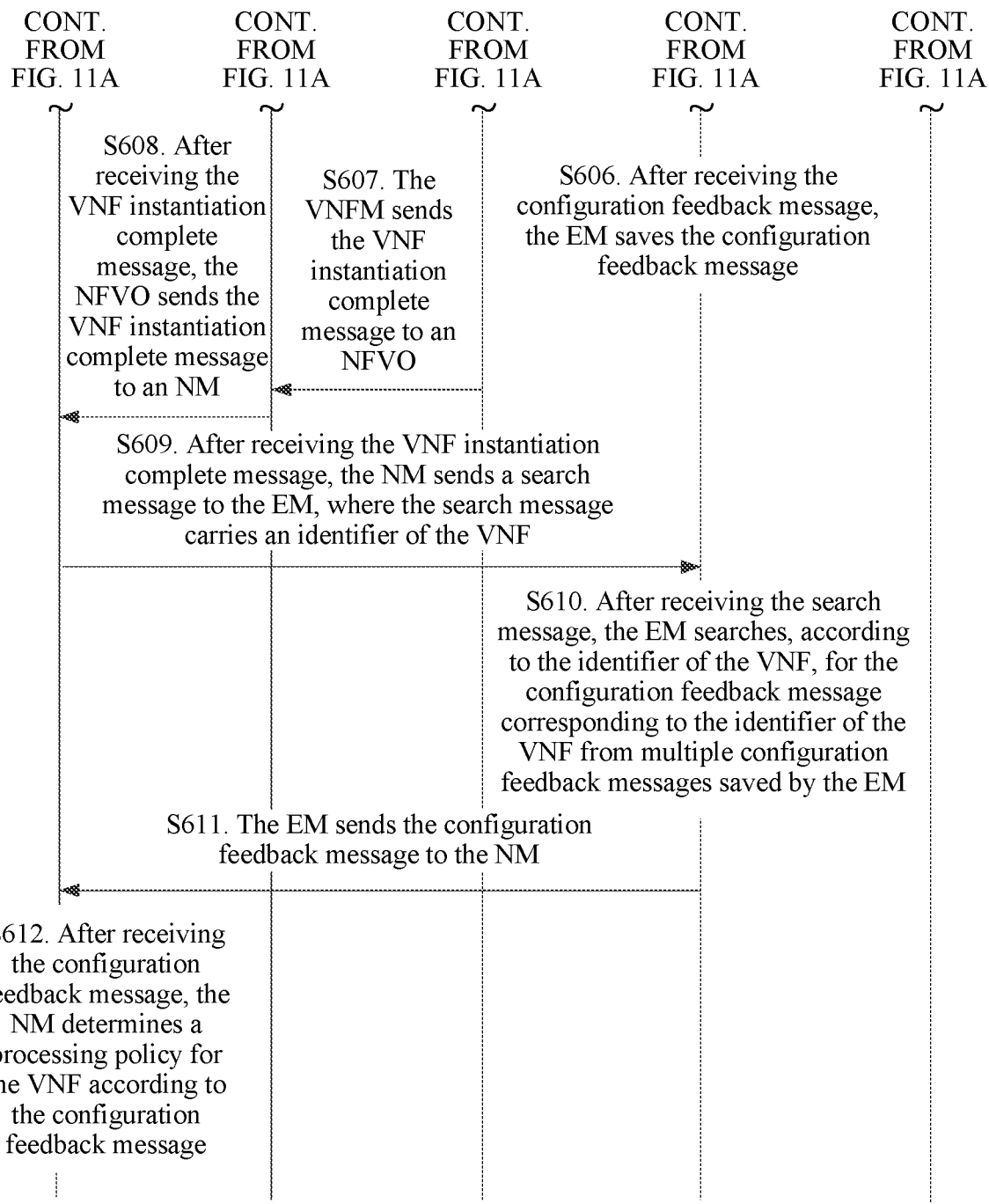

An embodiment of the present disclosure provides a VNF processing policy determining method. When a management node is an NM, as shown in FIG. 11A and FIG. 11B, the method may include the following steps.

S601. A VNFM sends a VNF instantiation complete message to an EM.

S602. After receiving the VNF instantiation complete message, the EM sends an application parameter configuration message to a VNF.

S603. After receiving the application parameter configuration message, the VNF configures an application parameter of the VNF according to the application parameter configuration message, and determines a configuration result of the application parameter of the VNF.

S604. The VNF generates a configuration feedback message according to the configuration result.

S605. The VNF sends the configuration feedback message to the EM.

Specifically, implementations of S601 to S605 in this embodiment of the present disclosure are the same as implementations of S401 to S405. For details, refer to related description of S401 to S405. Details are not described herein again.

S606. After receiving the configuration feedback message, the EM saves the configuration feedback message.

Specifically, after receiving the configuration feedback message, the EM saves a correspondence between the configuration feedback message and an identifier of the VNF that sends the configuration feedback message. The identifier of the VNF may be carried in the configuration feedback message. That is, if the configuration feedback message that is received by the EM and that is sent by the VNF carries the identifier of the VNF, the EM may directly save the configuration feedback message. Alternatively, the identifier of the VNF may be selected by the EM from VNF identifiers saved by the EM. That is, if the configuration feedback message that is received by the EM and that is sent by the VNF does not carry the identifier of the VNF, the EM may select the identifier of the VNF from the VNF identifiers saved by the EM, and save the correspondence between the identifier of the VNF and the configuration feedback message.

S607. The VNFM sends the VNF instantiation complete message to an NFVO.

S608. After receiving the VNF instantiation complete message, the NFVO sends the VNF instantiation complete message to the NM.

S609. After receiving the VNF instantiation complete message, the NM sends a search message to the EM, where the search message carries an identifier of the VNF.

In this embodiment of the present disclosure, after the NM receives the VNF instantiation complete message, and determines that instantiation of the VNF is completed, the NM may send, to the EM, the search message carrying the identifier of the VNF, to instruct the EM to search for the configuration feedback message corresponding to the identifier of the VNF, so as to learn of the configuration result of the application parameter of the VNF.

S610. After receiving the search message, the EM searches, according to the identifier of the VNF, for the configuration feedback message corresponding to the identifier of the VNF from multiple configuration feedback messages saved by the EM.

S611. The EM sends the configuration feedback message to the NM.

S612. After receiving the configuration feedback message, the NM determines a processing policy for the VNF according to the configuration feedback message.

Specifically, an implementation of S612 in this embodiment of the present disclosure is the same as an implementation of S509. For details, refer to related description of S509. Details are not described herein again.

In the VNF processing policy determining method provided in this embodiment of the present disclosure, a VNF can generate a configuration feedback message according to a configuration result of an application parameter, and send the configuration feedback message to an EM, so that the EM saves the configuration feedback message. Then, after determining that instantiation of the VNF is completed, an NM instructs the EM to search for the configuration feedback message, and receives the configuration feedback message sent by the EM. When determining that the instantiation of the VNF is completed, the NM learns of the configuration result of the application parameter of the VNF according to the configuration feedback message, and determines a processing policy for the VNF according to the configuration result, so as to avoid a problem that an NS constituted by the VNF whose application parameter fails to be configured cannot normally run when the NM instructs an NFVO to use the VNF to constitute the NS.

Optionally, in the VNF processing policy determining methods shown in FIG. 7, FIG. 10A and FIG. 10B, and FIG. 11A and FIG. 11B, failed configuration of an application parameter of a VNF may further mean that the VNF receives, in a specific period of time after a VNFM completes instantiation of the VNF, no application parameter configuration message sent by an EM. That is, after the VNFM completes the instantiation of the VNF, if the VNF receives, in the specific period of time, no application parameter configuration message sent by the EM, the VNF may determine that the application parameter of the VNF fails to be configured, generate a configuration feedback message, and send the configuration feedback message to the EM. The configuration feedback message is used to indicate that the application parameter of the VNF fails to be configured. After the EM sends the configuration feedback message to an NM or the VNFM, the VNFM or the NM can instruct, in a timely manner according to the configuration feedback message, an NFVO to release a resource occupied by the VNF. Therefore, this avoids a problem of a waste of resource occupied by a VNF whose application parameter fails to be configured. Then, the resource may be fully used, and resource utilization is improved.

Figure 12A:
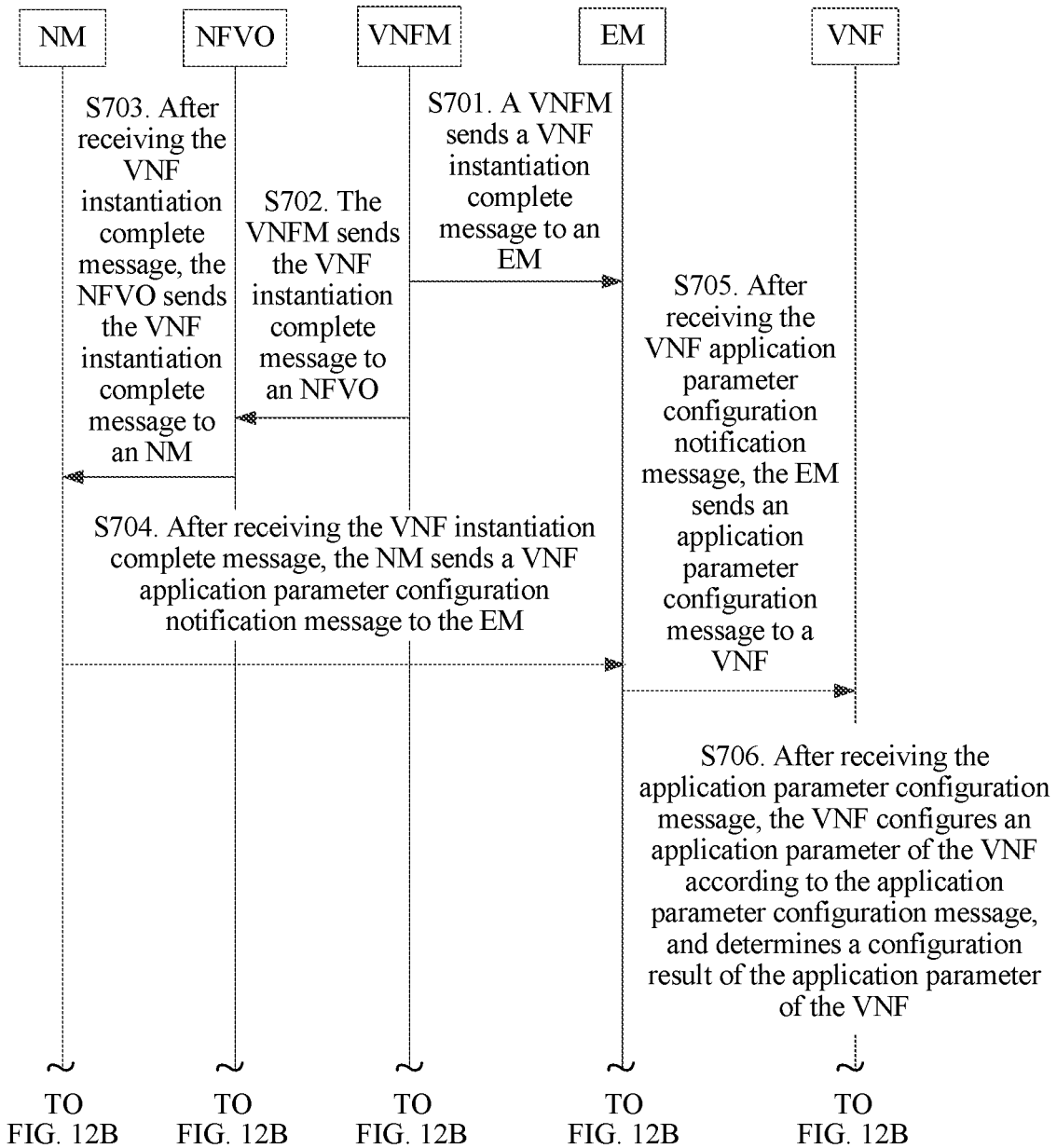
FIG. 12A and FIG. 12B are an eighth interaction diagram of a VNF processing policy determining method according to an embodiment of the present disclosure.
Figure 12B:
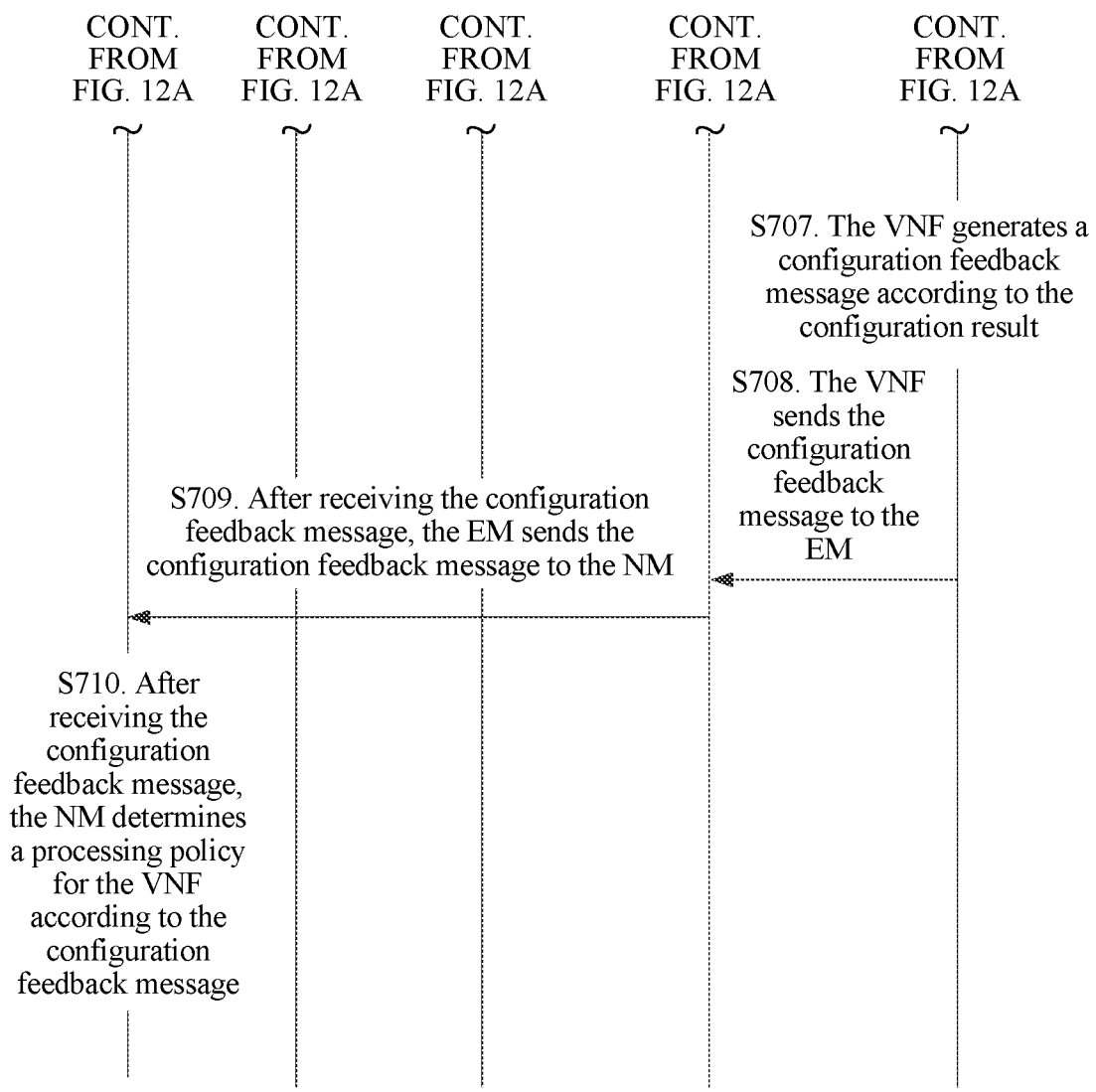

An embodiment of the present disclosure provides a VNF processing policy determining method. When a management node is an NM, as shown in FIG. 12A and FIG. 12B, the method may include the following steps.

S701. A VNFM sends a VNF instantiation complete message to an EM.

Specifically, after completing instantiation of a VNF, the VNFM sends the VNF instantiation complete message to the EM, to notify the EM that the instantiation of the VNF is completed.

For a specific process of instantiating the VNF by the VNFM, refer to a process, defined in an existing standard, of instantiating the VNF by the VNFM. Details are not described herein.

S702. The VNFM sends the VNF instantiation complete message to an NFVO.

Specifically, after the VNFM completes the instantiation of the VNF, the VNFM further sends the VNF instantiation complete message to the NFVO, to notify the NFVO that the instantiation of the VNF is completed. Then, after receiving the VNF instantiation complete message, the NFVO can determine that the instantiation of the VNF is completed, and notify the NM that the instantiation of the VNF is completed.

S703. After receiving the VNF instantiation complete message, the NFVO sends the VNF instantiation complete message to the NM.

S704. After receiving the VNF instantiation complete message, the NM sends a VNF application parameter configuration notification message to the EM.

The VNF application parameter configuration notification message may carry an identifier of the VNF.

Further, in this embodiment of the present disclosure, the NM determines, according to the received VNF instantiation complete message, that the instantiation of the VNF is completed. When the NM determines that the VNF needs to be used, the NM sends, to the EM, the VNF application parameter configuration notification message carrying the identifier of the VNF, to instruct the EM to configure an application parameter for the VNF. That is, in this embodiment of the present disclosure, after receiving the VNF instantiation complete message sent by the VNFM, the EM does not immediately configure the application parameter for the VNF, but configures the application parameter for the VNF according to an instruction of the VNF application parameter configuration notification message after the VNF application parameter configuration notification message sent by the NM is received.

S705. After receiving the VNF application parameter configuration notification message, the EM sends an application parameter configuration message to a VNF.

S706. After receiving the application parameter configuration message, the VNF configures an application parameter of the VNF according to the application parameter configuration message, and determines a configuration result of the application parameter of the VNF.

S707. The VNF generates a configuration feedback message according to the configuration result.

S708. The VNF sends the configuration feedback message to the EM.

Specifically, implementations of S705 to S708 in this embodiment of the present disclosure are similar to implementations of S502 to S505. A difference lies in that, in S705 in this embodiment of the present disclosure, after receiving the VNF application parameter configuration notification message sent by the NM, the EM configures the application parameter for the VNF according to the instruction of the VNF application parameter configuration notification message. However, in S502, the EM configures the application parameter for the VNF after receiving the VNF instantiation complete message sent by the VNFM and determining that the instantiation of the VNF is completed.

Further, for the specific implementations of S705 to S708, refer to related description of S502 to S505. Details are not described herein again.

S709. After receiving the configuration feedback message, the EM sends the configuration feedback message to the NM.

S710. After receiving the configuration feedback message, the NM determines a processing policy for the VNF according to the configuration feedback message.

Specifically, implementations of S709 and S710 are the same as implementations of S508 and S509. For details, refer to related description of S508 and S509. Details are not described herein.

In the VNF processing policy determining method provided in this embodiment of the present disclosure, an EM sends an application parameter configuration message to a VNF according to a VNF application parameter configuration notification message sent by an NM, so that the VNF configures an application parameter of the VNF according to the application parameter configuration message. The VNF generates a configuration feedback message according to a configuration result of the application parameter of the VNF, and sends the configuration feedback message to the EM. After the EM receives the configuration feedback message sent by the VNF, the EM sends the configuration feedback message to the NM, so that the NM learns of the configuration result of the application parameter of the VNF according to the configuration feedback message, and determines a processing policy for the VNF according to the configuration result. This avoids a problem that an NS constituted by the VNF whose application parameter fails to be configured cannot normally run when the NM instructs an NFVO to use the VNF to constitute the NS.

Figure 13:
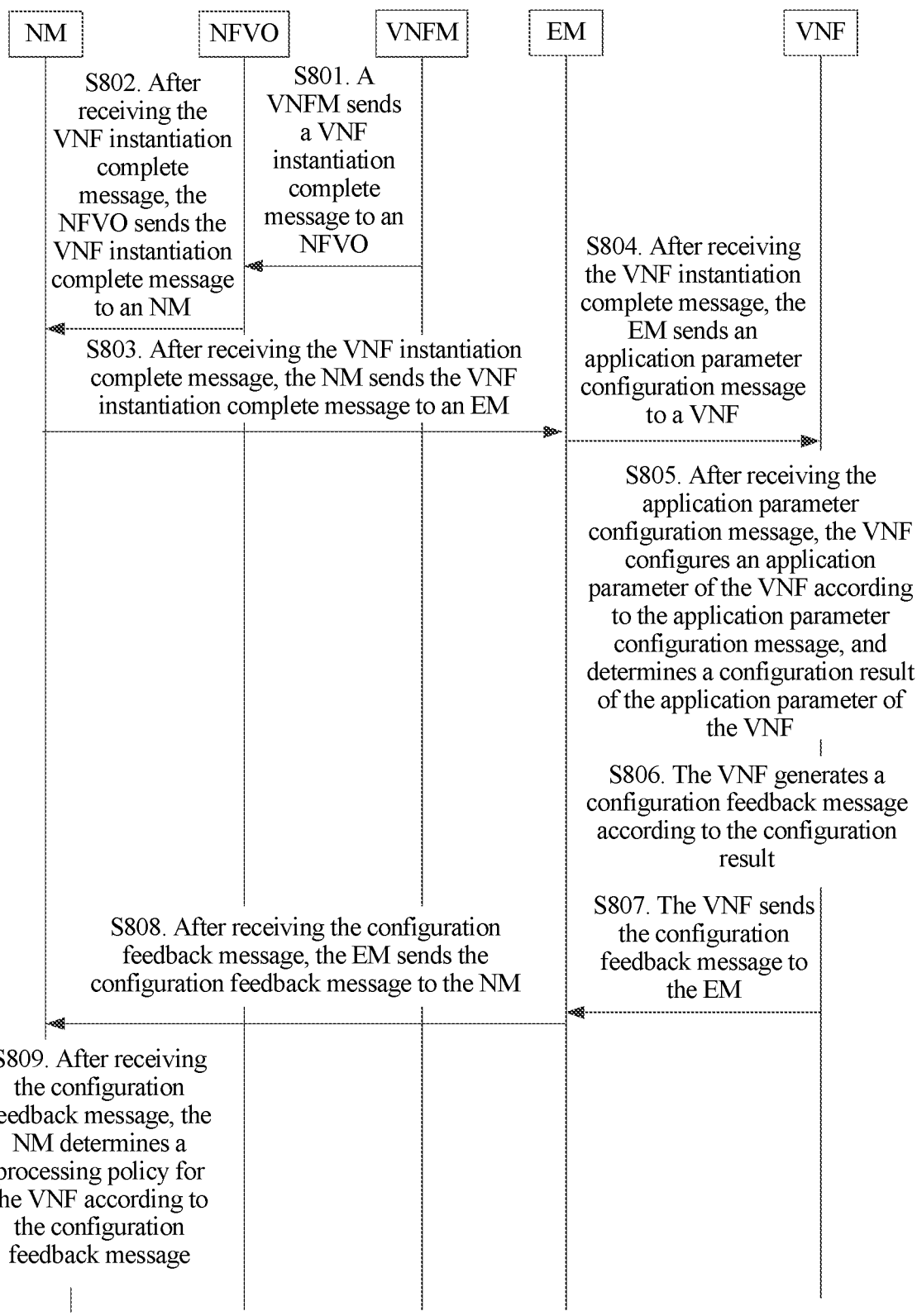
FIG. 13 is a ninth interaction diagram of a VNF processing policy determining method according to an embodiment of the present disclosure.

An embodiment of the present disclosure provides a VNF processing policy determining method. When a management node is an NM, as shown in FIG. 13, the method may include the following steps.

S801. A VNFM sends a VNF instantiation complete message to an NFVO.

Specifically, after completing instantiation of a VNF, the VNFM sends the VNF instantiation complete message to the NFVO, to notify the NFVO that the instantiation of the VNF is completed.

For a specific process of instantiating the VNF by the VNFM, refer to a process of instantiating the VNF by the VNFM in the prior art. Details are not described herein.

S802. After receiving the VNF instantiation complete message, the NFVO sends the VNF instantiation complete message to the NM.

S803. After receiving the VNF instantiation complete message, the NM sends the VNF instantiation complete message to an EM.

It should be noted that, in this embodiment of the present disclosure, after the NM receives the VNF instantiation complete message, and determines that the instantiation of the VNF is completed, the NM sends the VNF instantiation complete message to the EM, to notify the EM that the instantiation of the VNF is completed. That is, in this embodiment of the present disclosure, after completing the instantiation of the VNF, the VNFM does not notify the EM that the instantiation of the VNF is completed. Instead, after the VNFM sends the VNF instantiation complete message to the NM, to notify the NM that the instantiation of the VNF is completed, the NM notifies the EM that the instantiation of the VNF is completed.

S804. After receiving the VNF instantiation complete message, the EM sends an application parameter configuration message to a VNF.

S805. After receiving the application parameter configuration message, the VNF configures an application parameter of the VNF according to the application parameter configuration message, and determines a configuration result of the application parameter of the VNF.

S806. The VNF generates a configuration feedback message according to the configuration result.

S807. The VNF sends the configuration feedback message to the EM.

Specifically, implementations of S804 to S807 in this embodiment of the present disclosure are the same as implementations of S402 to S405. For details, refer to related description of S402 to S405. Details are not described herein again.

S808. After receiving the configuration feedback message, the EM sends the configuration feedback message to the NM.

S809. After receiving the configuration feedback message, the NM determines a processing policy for the VNF according to the configuration feedback message.

Specifically, implementations of S808 and S809 are the same as implementations of S508 and S509. For details, refer to related description of S508 and S509. Details are not described herein again.

In the VNF processing policy determining method provided in this embodiment of the present disclosure, after an NM determines that instantiation of the VNF is completed, the NM notifies an EM that the instantiation of the VNF is completed, so that the EM sends an application parameter configuration message to the VNF, to instruct the VNF to configure an application parameter of the VNF. After receiving a configuration feedback message sent by the VNF, the EM sends the configuration feedback message to the NM, so that the NM learns of a configuration result of the application parameter of the VNF according to the configuration feedback message, and determines a processing policy for the VNF according to the configuration result. This avoids a problem that an NS constituted by the VNF whose application parameter fails to be configured cannot normally run when the NM instructs an NFVO to use the VNF to constitute the NS.

This embodiment of the present disclosure provides a VNF processing policy determining method, and the method specifically includes: receiving, by a management node, a configuration feedback message sent by an EM, and determining, by the management node, a processing policy for the VNF according to the configuration feedback message. The configuration feedback message is used to indicate whether an application parameter of the VNF is successfully configured, and the processing policy is used by the management node to process the VNF. According to the method, the management node can learn of a configuration result of the application parameter of the VNF according to the configuration feedback message sent by the EM, and determine the processing policy for the VNF according to the configuration result. This avoids a problem that an NS constituted by the VNF cannot normally run when the EM fails to configure the application parameter for the VNF.

Embodiment 3

Figure 14:
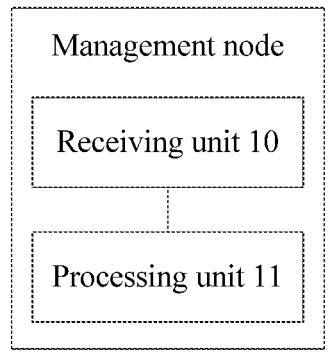
FIG. 14 is a schematic structural diagram of a management node according to an embodiment of the present disclosure.

As shown in FIG. 14, an embodiment of the present disclosure provides a management node, and the management node may include:

a receiving unit 10, configured to receive a configuration feedback message sent by an EM, where the configuration feedback message is used to indicate whether an application parameter of a VNF is successfully configured; and a processing unit 11, configured to determine a processing policy for the VNF according to the configuration feedback message received by the receiving unit 10, where the processing policy is used by the processing unit 11 to process the VNF.

Optionally, the management node is an NM.

If the configuration feedback message received by the receiving unit 10 indicates that the application parameter of the VNF is successfully configured, the processing policy determined by the processing unit 11 is that the processing unit 11 instructs an NFVO to use the VNF to constitute a network service NS.

If the configuration feedback message received by the receiving unit 10 indicates that the application parameter of the VNF fails to be configured, the processing policy determined by the processing unit 11 is that the processing unit 11 instructs the NFVO to release a resource occupied by the VNF.

Figure 15:
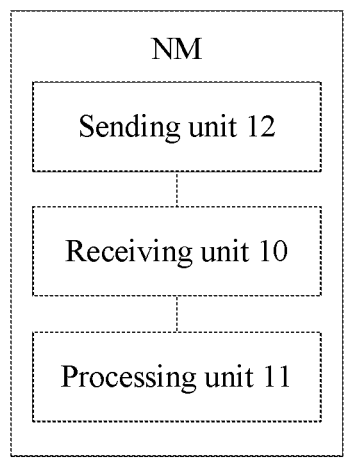
FIG. 15 is a schematic structural diagram of an NM according to an embodiment of the present disclosure.

Optionally, with reference to FIG. 14, as shown in FIG. 15, the management node is an NM, and the NM further includes a sending unit 12.

The sending unit 12 is configured to send a search message to the EM before the receiving unit 10 receives the configuration feedback message sent by the EM. The search message carries an identifier of the VNF, and the search message is used to instruct the EM to search for the configuration feedback message corresponding to the identifier of the VNF.

Optionally, as shown in FIG. 15, the NM further includes a sending unit 12.

The sending unit 12 is configured to send a VNF application parameter configuration notification message to the EM before the receiving unit 10 receives the configuration feedback message sent by the EM. The VNF application parameter configuration notification message is used to instruct the EM to configure the application parameter for the VNF.

Optionally, as shown in FIG. 15, the NM further includes a sending unit 12.

The sending unit 12 is configured to send a VNF instantiation complete message to the EM before the receiving unit 10 receives the configuration feedback message sent by the EM. The VNF instantiation complete message is used to indicate that instantiation of the VNF is completed.

Optionally, the management node is a VNFM.

If the configuration feedback message received by the receiving unit 10 indicates that the application parameter of the VNF is successfully configured, the processing policy determined by the processing unit 11 is that the processing unit 11 sends a VNF instantiation complete message to an NM by using an NFVO, and the NM instructs, according to the VNF instantiation complete message, the NFVO to use the VNF to constitute an NS.

If the configuration feedback message received by the receiving unit 10 indicates that the application parameter of the VNF fails to be configured, the processing policy determined by the processing unit 11 is that the processing unit 11 instructs the NFVO to release a resource occupied by the VNF.

This embodiment of the present disclosure provides a management node. The management node can receive a configuration feedback message sent by an EM, and determine a processing policy for a VNF according to the configuration feedback message. The configuration feedback message is used to indicate whether an application parameter of the VNF is successfully configured, and the processing policy is used by the management node to process the VNF. The management node provided in this embodiment of the present disclosure can learn of a configuration result of the application parameter of the VNF according to the configuration feedback message sent by the EM, and determine the corresponding processing policy for the VNF according to the configuration result, that is, whether the application parameter of the VNF is successfully configured or not. Consequently, this avoids a problem that an NS constituted by the VNF cannot normally run when the EM fails to configure the application parameter for the VNF and an NM still considers that the VNF can normally run.

Figure 16:
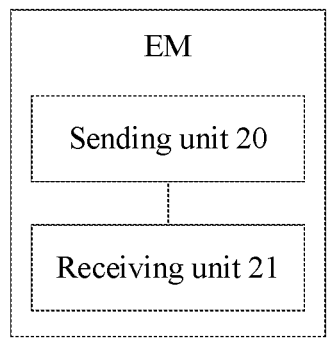
FIG. 16 is a first schematic structural diagram of an EM according to an embodiment of the present disclosure.

As shown in FIG. 16, an embodiment of the present disclosure provides an EM, and the EM may include: a sending unit 20, configured to send an application parameter configuration message to a VNF, where the application parameter configuration message is used to instruct the VNF to configure an application parameter of the VNF; and a receiving unit 21, configured to receive a configuration feedback message sent by the VNF, where the configuration feedback message is used to indicate whether the application parameter of the VNF is successfully configured.

The sending unit 20 is further configured to send, to a management node, the configuration feedback message received by the receiving unit 21. The configuration feedback message is used by the management node to determine a processing policy for the VNF, and the processing policy is used by the management node to process the VNF.

Figure 17:
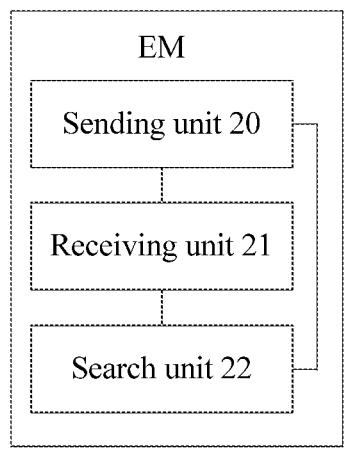
FIG. 17 is a second schematic structural diagram of an EM according to an embodiment of the present disclosure.

Optionally, with reference to FIG. 16, as shown in FIG. 17, the management node is an NM, and the EM further includes a search unit 22.

The receiving unit 21 is further configured to receive, before the sending unit 20 sends the configuration feedback message to the management node, a search message sent by the NM. The search message carries an identifier of the VNF, and the search message is used to instruct the search unit 22 to search for the configuration feedback message corresponding to the identifier of the VNF.

The search unit 22 is configured to search, according to the identifier of the VNF, for the configuration feedback message corresponding to the identifier of the VNF from multiple saved configuration feedback messages.

Optionally, the management node is an NM.

The receiving unit 21 is further configured to receive, before the sending unit 20 sends the application parameter configuration message to the VNF, a VNF application parameter configuration notification message sent by the NM or a VNFM. The VNF application parameter configuration notification message is used to instruct the EM to configure the application parameter for the VNF.

The sending unit 20 is specifically configured to send the configuration feedback message to the NM.

Optionally, the management node is an NM.

The receiving unit 21 is further configured to receive, before the sending unit 20 sends the application parameter configuration message to the VNF, a VNF instantiation complete message sent by the NM. The VNF instantiation complete message is used to indicate that instantiation of the VNF is completed.

The sending unit 20 is specifically configured to send the configuration feedback message to the NM.

Optionally, the management node is a VNFM.

The receiving unit 21 is further configured to receive, before the sending unit 20 sends the application parameter configuration message to the VNF, a VNF instantiation complete message sent by the VNFM. The VNF instantiation complete message is used to indicate that instantiation of the VNF is completed.

The sending unit 20 is specifically configured to send the configuration feedback message to the VNFM.

This embodiment of the present disclosure provides an EM. The EM can send an application parameter configuration message to a VNF, receive a configuration feedback message sent by the VNF, and send the configuration feedback message to a management node. The application parameter configuration message is used to instruct the VNF to configure an application parameter of the VNF. The configuration feedback message is used to indicate whether the application parameter of the VNF is successfully configured. The configuration feedback message is used by the management node to determine a processing policy for the VNF, and the processing policy is used by the management node to process the VNF. The EM provided in this embodiment of the present disclosure can receive the configuration feedback message sent by the VNF, and send the configuration feedback message to the management node, so that the management node can learn of a configuration result of the application parameter of the VNF according to the configuration feedback message, and determine the corresponding processing policy for the VNF according to the configuration result, that is, whether the application parameter of the VNF is successfully configured or not. Consequently, this avoids a problem that an NS constituted by the VNF cannot normally run when the EM fails to configure the application parameter for the VNF and an NM still considers that the VNF can normally run.

Figure 18:
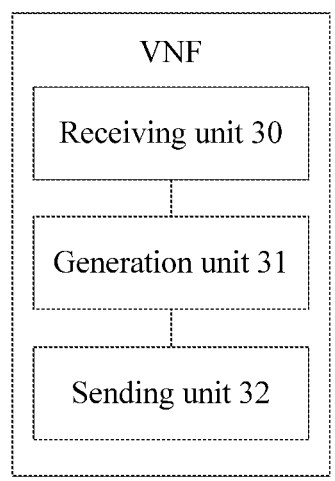
FIG. 18 is a schematic structural diagram of a VNF according to an embodiment of the present disclosure.

As shown in FIG. 18, an embodiment of the present disclosure provides a VNF, and the VNF may include: a receiving unit 30, configured to receive an application parameter configuration message sent by an element manager EM, where the application parameter configuration message is used to instruct the VNF to configure an application parameter of the VNF; a generation unit 31, configured to generate a configuration feedback message according to a result of configuring the application parameter by the VNF, where the configuration feedback message is used to indicate whether the application parameter of the VNF is successfully configured; and a sending unit 32, configured to send, to the EM, the configuration feedback message generated by the generation unit 31, where the EM sends the configuration feedback message to a management node, the configuration feedback message is used by the management node to determine a processing policy for the VNF, and the processing policy is used by the management node to process the VNF.

Optionally, the configuration feedback message generated by the generation unit 31 carries an identifier of the VNF, and the identifier of the VNF is allocated by the EM, the management node, or an NFVO to the VNF.

This embodiment of the present disclosure provides a VNF. The VNF can receive an application parameter configuration message sent by an EM, and generate a configuration feedback message according to a result of configuring an application parameter by the VNF. In addition, the VNF sends the configuration feedback message to the EM. The application parameter configuration message is used to instruct the VNF to configure the application parameter of the VNF, and the configuration feedback message is used to indicate whether the application parameter of the VNF is successfully configured. The VNF provided in this embodiment of the present disclosure can generate the configuration feedback message according to the result of configuring the application parameter, and send the configuration feedback message to the EM. After the EM receives the configuration feedback message, the EM sends the configuration feedback message to a management node, so that the management node can learn of the configuration result of the application parameter of the VNF according to the configuration feedback message, and determine a corresponding processing policy for the VNF according to the configuration result, that is, whether the application parameter of the VNF is successfully configured or not. Consequently, this avoids a problem that an NS constituted by the VNF cannot normally run when the EM fails to configure the application parameter for the VNF and an NM still considers that the VNF can normally run.

Embodiment 4

Figure 19:
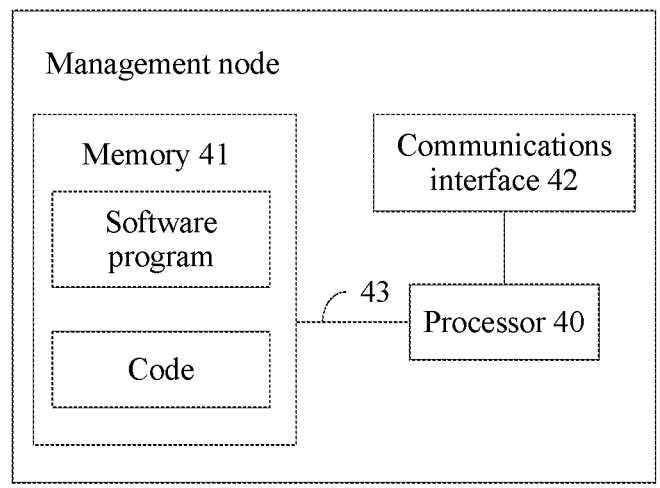
FIG. 19 is a schematic structural diagram of hardware of a management node according to an embodiment of the present disclosure.

As shown in FIG. 19, an embodiment of the present disclosure provides a management node, and the management node may include a processor 40, a memory 41, a communications interface 42, and a system bus 43. The processor 40, the memory 41, and the communications interface 42 are connected and communicate with each other by using the system bus 43.

The processor 40 may be a central processing unit (CPU for short), or an application-specific integrated circuit (ASIC for short), or be configured as one or more integrated circuits that implement this embodiment of the present disclosure.

The memory 41 may include a volatile memory, for example, a random-access memory (RAM for short). Alternatively, the memory 41 may include a non-volatile memory, for example, a read-only memory (ROM for short), a flash memory, a hard disk drive (HDD for short), or a solid state drive (SSD for short). Alternatively, the memory 41 may include a combination of the foregoing types of memories.

The communications interface 42 is used for interaction with another node, for example, interaction with an EM.

When the management node is running, the processor 40 and the memory 41 may execute the method procedure shown in any one of FIG. 2, or FIG. 5 to FIG. 13. Details are as follows.

The processor 40 is configured to receive a configuration feedback message sent by an EM, and determine a processing policy for a VNF according to the configuration feedback message. The configuration feedback message is used to indicate whether an application parameter of the VNF is successfully configured, and the processing policy is used by the processor to process the VNF. The memory 41 is configured to store code of the configuration feedback message and code of the processing policy, and control the processor 40 to complete a software program in the foregoing process, so that the processor 40 completes the foregoing process by executing the software program and invoking the code of the configuration feedback message and the code of the processing policy.

It should be noted that the processor 40 sends a related message to the EM by using the communications interface 42, and receives, by using the communications interface 42, a related message sent by the EM.

Optionally, the management node is an NM.

If the configuration feedback message received by the processor 40 indicates that the application parameter of the VNF is successfully configured, the processing policy determined by the processor 40 is that the processor 40 instructs an NFVO to use the VNF to constitute a network service NS.

If the configuration feedback message received by the processor 40 indicates that the application parameter of the VNF fails to be configured, the processing policy determined by the processor 40 is that the processor 40 instructs the NFVO to release a resource occupied by the VNF.

Optionally, the management node is an NM.

The processor 40 is further configured to send a search message to the EM before receiving the configuration feedback message sent by the EM. The search message carries an identifier of the VNF, and the search message is used to instruct the EM to search for the configuration feedback message corresponding to the identifier of the VNF.

Optionally, the management node is an NM.

The processor 40 is further configured to send a VNF application parameter configuration notification message to the EM before receiving the configuration feedback message sent by the EM. The VNF application parameter configuration notification message is used to instruct the EM to configure the application parameter for the VNF.

Optionally, the management node is an NM.

The processor 40 is further configured to send a VNF instantiation complete message to the EM before receiving the configuration feedback message sent by the EM. The VNF instantiation complete message is used to indicate that instantiation of the VNF is completed.

Optionally, the management node is a VNFM.

If the configuration feedback message received by the processor 40 indicates that the application parameter of the VNF is successfully configured, the processing policy determined by the processor 40 is that the processor 40 sends a VNF instantiation complete message to an NM by using an NFVO, and the NM instructs, according to the VNF instantiation complete message, the NFVO to use the VNF to constitute an NS.

If the configuration feedback message received by the processor 40 indicates that the application parameter of the VNF fails to be configured, the processing policy determined by the processor 40 is that the processor 40 instructs the NFVO to release a resource occupied by the VNF.

This embodiment of the present disclosure provides a management node. The management node can receive a configuration feedback message sent by an EM, and determine a processing policy for a VNF according to the configuration feedback message. The configuration feedback message is used to indicate whether an application parameter of the VNF is successfully configured, and the processing policy is used by the management node to process the VNF. The management node provided in this embodiment of the present disclosure can learn of a configuration result of the application parameter of the VNF according to the configuration feedback message sent by the EM, and determine the corresponding processing policy for the VNF according to the configuration result, that is, whether the application parameter of the VNF is successfully configured or not. Consequently, this avoids a problem that an NS constituted by the VNF cannot normally run when the EM fails to configure the application parameter for the VNF and an NM still considers that the VNF can run normally.

Figure 20:
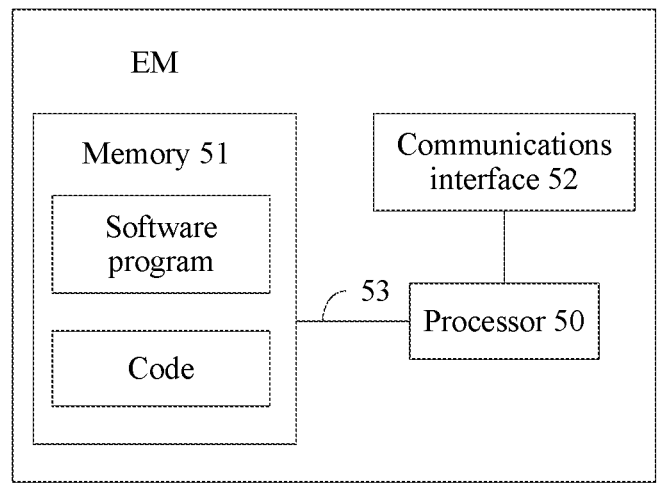
FIG. 20 is a schematic structural diagram of hardware of an EM according to an embodiment of the present disclosure.

As shown in FIG. 20, an embodiment of the present disclosure provides an EM, and the EM may include a processor 50, a memory 51, a communications interface 52, and a system bus 53. The processor 50, the memory 51, and the communications interface 52 are connected and communicate with each other by using the system bus 53.

The processor 50 may be a CPU, or an ASIC, or be configured as one or more integrated circuits that implement this embodiment of the present disclosure.

The memory 51 may include a volatile memory such as an RAM. Alternatively, the memory 51 may include a non-volatile memory such as an ROM, a flash memory, an HDD, or an SSD. Alternatively, the memory 51 may include a combination of the foregoing types of memories.

The communications interface 52 is used for interaction with another node, for example, interaction with a management node.

When the EM is running, the processor 50 and the memory 51 may execute the method procedure shown in any one of FIG. 3, or FIG. 5 to FIG. 13. Details are as follows.

The processor 50 is configured to send an application parameter configuration message to a VNF, receive a configuration feedback message sent by the VNF, and send the configuration feedback message to a management node. The application parameter configuration message is used to instruct the VNF to configure an application parameter of the VNF. The configuration feedback message is used to indicate whether the application parameter of the VNF is successfully configured. The configuration feedback message is used by the management node to determine a processing policy for the VNF, and the processing policy is used by the management node to process the VNF. The memory 51 is configured to store code of the application parameter configuration message and code of the configuration feedback message, and control the processor 50 to complete a software program in the foregoing process, so that the processor 50 completes the foregoing process by executing the software program and invoking the code of the application parameter configuration message and the code of the configuration feedback message.

It should be noted that the processor 50 sends a related message to the EM by using the communications interface 52, and receives, by using the communications interface 52, a related message sent by the EM.

Optionally, the management node is an NM.

The processor 50 is further configured to receive, before sending the configuration feedback message to the NM, a search message sent by the NM. The search message carries an identifier of the VNF, and the search message is used to instruct the processor 50 to search for the configuration feedback message corresponding to the identifier of the VNF.

The processor 50 is specifically configured to search, according to the identifier of the VNF, for the configuration feedback message corresponding to the identifier of the VNF from multiple saved configuration feedback messages.

Optionally, the management node is an NM.

The processor 50 is further configured to receive, before sending the application parameter configuration message to the VNF, a VNF application parameter configuration notification message sent by the NM. The VNF application parameter configuration notification message is used to instruct the processor 50 to configure the application parameter for the VNF.

The processor 50 is specifically configured to send the configuration feedback message to the NM.

Optionally, the management node is an NM.

The processor 50 is further configured to receive, before sending the application parameter configuration message to the VNF, a VNF instantiation complete message sent by the NM or a VNFM. The VNF instantiation complete message is used to indicate that instantiation of the VNF is completed.

The processor 50 is specifically configured to send the configuration feedback message to the NM.

Optionally, the management node is a VNFM.

The processor 50 is further configured to receive, before sending the application parameter configuration message to the VNF, a VNF instantiation complete message sent by the VNFM. The VNF instantiation complete message is used to indicate that instantiation of the VNF is completed.

The processor 50 is specifically configured to send the configuration feedback message to the VNFM.

This embodiment of the present disclosure provides an EM. The EM can send an application parameter configuration message to a VNF, receive a configuration feedback message sent by the VNF, and send the configuration feedback message to a management node. The application parameter configuration message is used to instruct the VNF to configure an application parameter of the VNF. The configuration feedback message is used to indicate whether the application parameter of the VNF is successfully configured. The configuration feedback message is used by the management node to determine a processing policy for the VNF, and the processing policy is used by the management node to process the VNF. The EM provided in this embodiment of the present disclosure can receive the configuration feedback message sent by the VNF, and send the configuration feedback message to the management node, so that the management node can learn of a configuration result of the application parameter of the VNF according to the configuration feedback message, and determine the corresponding processing policy for the VNF according to the configuration result, that is, whether the application parameter of the VNF is successfully configured or not. Consequently, this avoids a problem that an NS constituted by the VNF cannot normally run when the EM fails to configure the application parameter for the VNF and an NM still considers that the VNF can normally run.

Figure 21:
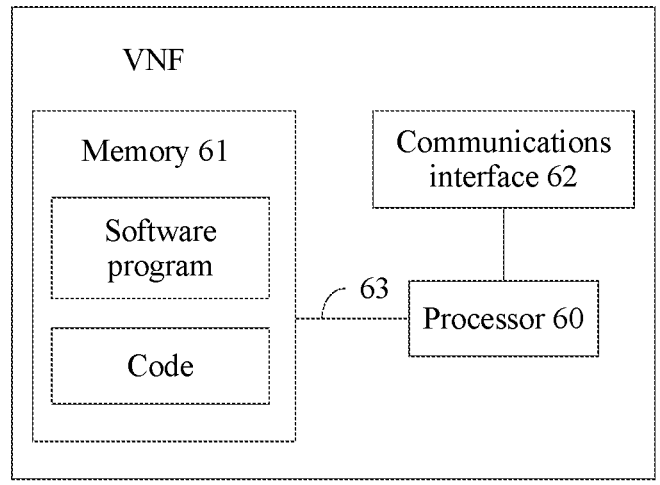
FIG. 21 is a schematic structural diagram of hardware of a VNF according to an embodiment of the present disclosure.

As shown in FIG. 21, an embodiment of the present disclosure provides a VNF, and the VNF may include a processor 60, a memory 61, a communications interface 62, and a system bus 63. The processor 60, the memory 61, and the communications interface 62 are connected and communicate with each other by using the system bus 63.

The processor 60 may be a CPU, or an ASIC, or be configured as one or more integrated circuits that implement this embodiment of the present disclosure.

The memory 61 may include a volatile memory such as an RAM. Alternatively, the memory 61 may include a non-volatile memory such as an ROM, a flash memory, an HDD, or an SSD. Alternatively, the memory 61 may include a combination of the foregoing types of memories.

The communications interface 62 is used for interaction with another node, for example, interaction with an EM.

When the VNF is running, the processor 60 and the memory 61 may execute the method procedure shown in any one of FIG. 4 to FIG. 13. Details are as follows.

The processor 60 is configured to receive an application parameter configuration message sent by an EM, generate a configuration feedback message according to a result of configuring an application parameter by the VNF, and send the configuration feedback message to the EM. The EM sends the configuration feedback message to a management node. The application parameter configuration message is used to instruct the processor to configure the application parameter of the VNF. The configuration feedback message is used to indicate whether the application parameter of the VNF is successfully configured. The configuration feedback message is used by the management node to determine a processing policy for the VNF, and the processing policy is used by the management node to process the VNF. The memory 61 is configured to store code of the application parameter configuration message, code of the configuration feedback message, and code of the result of configuring the application parameter by the VNF, and control the processor 60 to complete a software program in the foregoing process, so that the processor 60 completes the foregoing process by executing the software program and invoking the code of the application parameter configuration message, the code of the configuration feedback message, and the code of the result of configuring the application parameter by the VNF.

It should be noted that the processor 60 sends a related message to the EM by using the communications interface 62, and receives, by using the communications interface 62, a related message sent by the EM.

Optionally, the configuration feedback message generated by the processor 60 carries an identifier of the VNF, and the identifier of the VNF is allocated by the EM, the management node, or an NFVO to the VNF.

This embodiment of the present disclosure provides a VNF. The VNF can receive an application parameter configuration message sent by an EM, and generate a configuration feedback message according to a result of configuring an application parameter by the VNF. In addition, the VNF sends the configuration feedback message to the EM. The application parameter configuration message is used to instruct the VNF to configure the application parameter of the VNF, and the configuration feedback message is used to indicate whether the application parameter of the VNF is successfully configured. The VNF provided in this embodiment of the present disclosure can generate the configuration feedback message according to the result of configuring the application parameter, and send the configuration feedback message to the EM. After the EM receives the configuration feedback message, the EM sends the configuration feedback message to a management node, so that the management node can learn of the configuration result of the application parameter of the VNF according to the configuration feedback message, and determine a corresponding processing policy for the VNF according to the configuration result, that is, whether the application parameter of the VNF is successfully configured or not. Consequently, this avoids a problem that an NS constituted by the VNF cannot normally run when the EM fails to configure the application parameter for the VNF and an NM still considers that the VNF can normally run.

Embodiment 5

Figure 22:
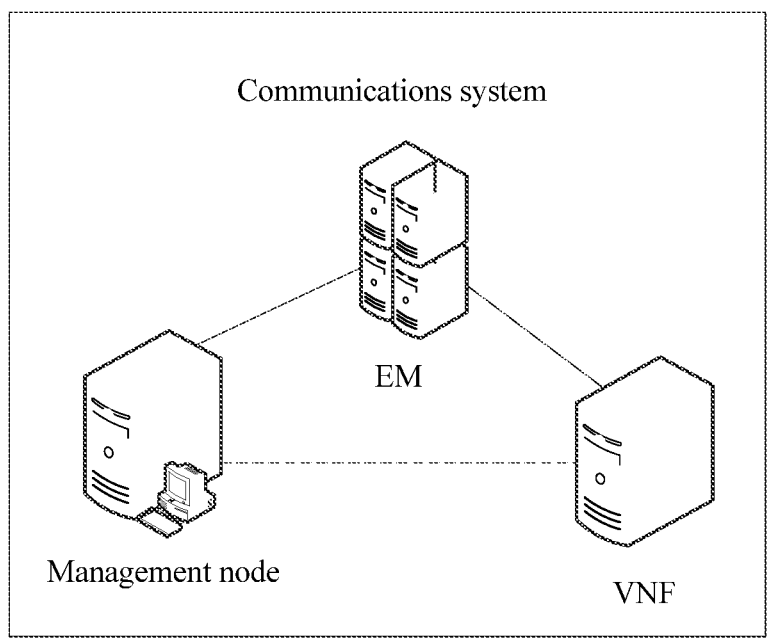
FIG. 22 is a block diagram of a communications system according to an embodiment of the present disclosure.

As shown in FIG. 22, an embodiment of the present disclosure provides a communications system. The communications system may include the management node shown in FIG. 14 or FIG. 15, the EM shown in FIG. 16 or FIG. 17, and the VNF shown in FIG. 18. Alternatively, the communications system provided in this embodiment of the present disclosure may include the management node shown in FIG. 19, the EM shown in FIG. 20, and the VNF shown in FIG. 21.

In the communications system provided in this embodiment of the present disclosure, the management node can receive a configuration feedback message sent by the EM, and determine a processing policy for the VNF according to the configuration feedback message. The EM can send an application parameter configuration message to the VNF, receive the configuration feedback message sent by the VNF, and send the configuration feedback message to the management node. The VNF can receive the application parameter configuration message sent by the EM, and generate the configuration feedback message according to a result of configuring an application parameter by the VNF. In addition, the VNF sends the configuration feedback message to the EM. The application parameter configuration message is used to instruct the VNF to configure the application parameter of the VNF, the configuration feedback message is used to indicate whether the application parameter of the VNF is successfully configured, and the processing policy is used by the management node to process the VNF.

It may be understood that the management node in the communications system provided in this embodiment of the present disclosure is the management node shown in FIG. 14, FIG. 15, or FIG. 19, and can perform the VNF processing policy determining method shown in any one of FIG. 2, or FIG. 5 to FIG. 13. For a method execution procedure and a specific function of each module or apparatus in the management node, refer to description in the embodiment shown in FIG. 2, or FIG. 5 to FIG. 13, and details are not described herein again.

The EM in the communications system provided in this embodiment of the present disclosure is the EM shown in FIG. 16, FIG. 17, or FIG. 20, and can perform the VNF processing policy determining method shown in any one of FIG. 3, or FIG. 5 to FIG. 13. For a method execution procedure and a specific function of each module or apparatus in the EM, refer to description in the embodiment shown in FIG. 3, or FIG. 5 to FIG. 13, and details are not described herein again.

The VNF in the communications system provided in this embodiment of the present disclosure is the VNF shown in FIG. 18 or FIG. 21, and can perform the VNF processing policy determining method shown in any one of FIG. 4 to FIG. 13. For a method execution procedure and a specific function of each module or apparatus in the VNF, refer to description in the embodiments shown in FIG. 4 to FIG. 13, and details are not described herein again.

It should be noted that, when the management node is an NM, the NM is not directly connected to the VNF. When the management node is a VNFM, the VNFM is connected to the VNF.

According to the communications system provided in this embodiment of the present disclosure, a VNF can generate a configuration feedback message according to a result of configuring an application parameter, and send the configuration feedback message to an EM. After the EM receives the configuration feedback message, the EM sends the configuration feedback message to a management node, so that the management node can learn of the configuration result of the application parameter of the VNF according to the configuration feedback message, and determine a corresponding processing policy for the VNF according to the configuration result, that is, whether the application parameter of the VNF is successfully configured or not. Consequently, this avoids a problem that an NS constituted by the VNF cannot normally run when the EM fails to configure the application parameter for the VNF and an NM still considers that the VNF can normally run.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a USB flash drive, a read-only memory (acronym in English: ROM), a random access memory (acronym in English: RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
    receiving, by a network manager (NM), a virtualized network function (VNF) instantiation complete message, wherein the VNF instantiation complete message indicates that instantiation of a VNF is completed;
    receiving, by the NM, a configuration feedback message sent by an element manager (EM), wherein the configuration feedback message is sent by the EM in response to the EM performing configuration of an application parameter of the VNF, and the configuration feedback message indicates whether the application parameter of the VNF is successfully configured by the EM; and
    after receiving the VNF instantiation complete message and the configuration feedback message, determining, by the NM, a processing policy for the VNF according to the configuration feedback message, wherein the processing policy is used by the NM to process the VNF.

2. The method according to claim 1, wherein:
    when the configuration feedback message indicates that the application parameter of the VNF is successfully configured, the processing policy is that the NM instructs a network functions virtualization orchestrator (NFVO) to use the VNF to constitute a network service (NS); and
    when the configuration feedback message indicates that the application parameter of the VNF has failed to be configured, the processing policy is that the NM instructs the NFVO to release a resource occupied by the VNF.

3. The method according to claim 2, wherein before receiving, by the NM, the configuration feedback message sent by the EM, the method further comprises:
    sending, by the NM, a search message to the EM, wherein the search message carries an identifier of the VNF, and the search message instructs the EM to search for the configuration feedback message corresponding to the identifier of the VNF.

4. The method according to claim 2, wherein before receiving, by the NM, the configuration feedback message sent by the EM, the method further comprises:
    sending, by the NM, a VNF application parameter configuration notification message to the EM, wherein the VNF application parameter configuration notification message instructs the EM to configure the application parameter for the VNF.

5. The method according to claim 2, wherein before receiving, by the NM, the configuration feedback message sent by the EM, the method further comprises:
    sending, by the NM, the VNF instantiation complete message to the EM.

6. The method according to claim 1, wherein the VNF instantiation complete message is received by the NM from a network functions virtualization orchestrator (NFVO).

7. An apparatus, used for a network manager (NM), comprising:
    a receiver, configured to:
        receive a virtualized network function (VNF) instantiation complete message, wherein the VNF instantiation complete message indicates that instantiation of a VNF is completed; and
        receive a configuration feedback message sent by an element manager (EM) wherein the configuration feedback message is sent by the EM in response to the EM performing configuration of an application parameter of the VNF, and the configuration feedback message indicates whether the application parameter of a the VNF is successfully configured by the EM; and
    a processor, configured to:
        after the VNF instantiation complete message and the configuration feedback message are received, determine a processing policy for the VNF according to the configuration feedback message received by the receiver, wherein the processing policy is used by the processor to process the VNF.

8. The apparatus according to claim 7, wherein:
    when the configuration feedback message received by the receiver indicates that the application parameter of the VNF is successfully configured, the processing policy determined by the processor is that the processor instructs a network functions virtualization orchestrator (NFVO) to use the VNF to constitute a network service NS; and
    when the configuration feedback message received by the receiver indicates that the application parameter of the VNF fails to be configured, the processing policy determined by the processor is that the processor instructs the NFVO to release a resource occupied by the VNF.

9. The apparatus according to claim 8, wherein the NM further comprises a transmitter; and
wherein the transmitter is configured to send a search message to the EM before the receiver receives the configuration feedback message sent by the EM, wherein the search message carries an identifier of the VNF, and the search message instructs the EM to search for the configuration feedback message corresponding to the identifier of the VNF.

10. The apparatus according to claim 8, wherein the NM further comprises a transmitter; and
wherein the transmitter is configured to send a VNF application parameter configuration notification message to the EM before the receiver receives the configuration feedback message sent by the EM, wherein the VNF application parameter configuration notification message instructs the EM to configure the application parameter for the VNF.

11. The apparatus according to claim 8, wherein the NM further comprises a transmitter; and
wherein the transmitter is configured to send a VNF instantiation complete message to the EM before the receiver receives the configuration feedback message sent by the EM, wherein the VNF instantiation complete message indicates that instantiation of the VNF is completed.

12. A non-transitory processor-readable medium having processor-executable instructions stored thereon for a network manager (NM), the processor-executable instructions, when executed by a processor, facilitating performance of the following:
receiving a virtualized network function (VNF) instantiation complete message, wherein the VNF instantiation complete message indicates that instantiation of a VNF is completed;
receiving a configuration feedback message sent by an element manager (EM), wherein the configuration feedback message is sent by the EM in response to the EM performing configuration of an application parameter of the VNF, and the configuration feedback message indicates whether the application parameter of the VNF is successfully configured; and
after the VNF instantiation complete message and the configuration feedback message are received, determining a processing policy for the VNF according to the configuration feedback message, wherein the processing policy is used by the processor to process the VNF.

13. The medium according to claim 12, wherein:
when the configuration feedback message indicates that the application parameter of the VNF is successfully configured, the processing policy is that the NM instructs a network functions virtualization orchestrator (NFVO) to use the VNF to constitute a network service NS; and
when the configuration feedback message indicates that the application parameter of the VNF has failed to be configured, the processing policy is that the NM instructs the NFVO to release a resource occupied by the VNF.

14. The medium according to claim 13, wherein before receiving the configuration feedback message sent by the EM, the processor-executable instructions, when executed by the processor, facilitate performance of the following:
sending a search message to the EM, wherein the search message carries an identifier of the VNF, and the search message instructs the EM to search for the configuration feedback message corresponding to the identifier of the VNF.

15. The medium according to claim 12, wherein before receiving the configuration feedback message sent by an EM, the processor-executable instructions, when executed by the processor, facilitate performance of the following:
sending a VNF application parameter configuration notification message to the EM, wherein the VNF application parameter configuration notification message instructs the EM to configure the application parameter for the VNF.

16. The medium according to claim 12, wherein before receiving the configuration feedback message sent by the EM, the processor-executable instructions, when executed by the processor, facilitate performance of the following:
sending the VNF instantiation complete message to the EM.

17. The medium according to claim 12, wherein the configuration feedback message carries an identifier of the VNF.

* * * * *